Dec. 14, 1954     J. NEUFELD     2,696,891
SEISMIC SURVEYING
Filed Nov. 26, 1951     9 Sheets-Sheet 1
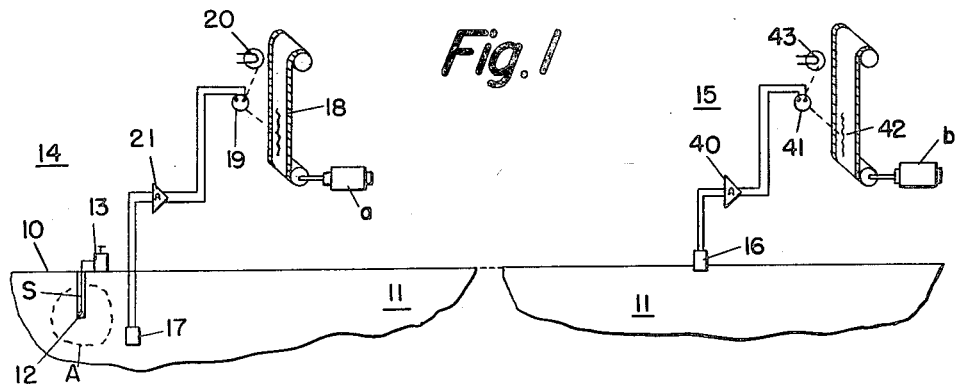
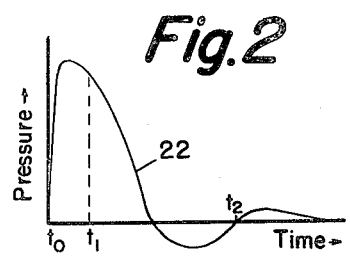
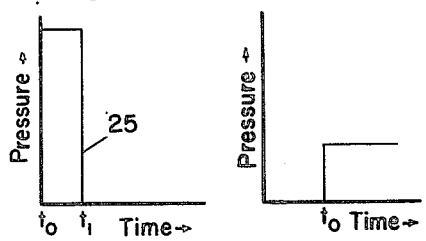
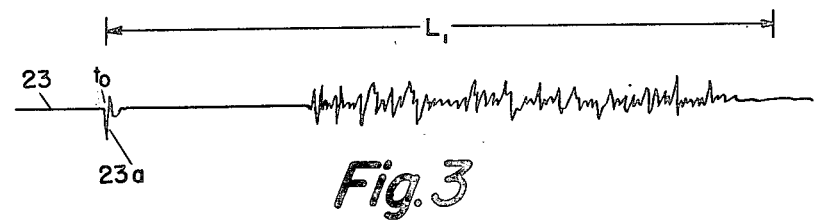
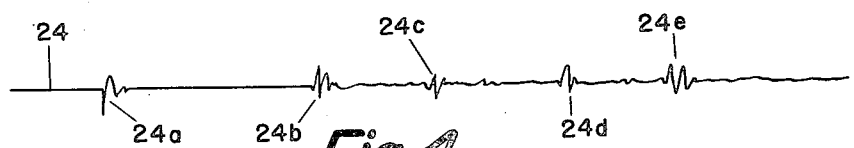
INVENTOR.
JACOB NEUFELD
BY
*Sidney A. Johnson*
ATTORNEY Dec. 14, 1954   J. NEUFELD   2,696,891
SEISMIC SURVEYING
Filed Nov. 26, 1951   9 Sheets-Sheet 2
*Fig. 6*
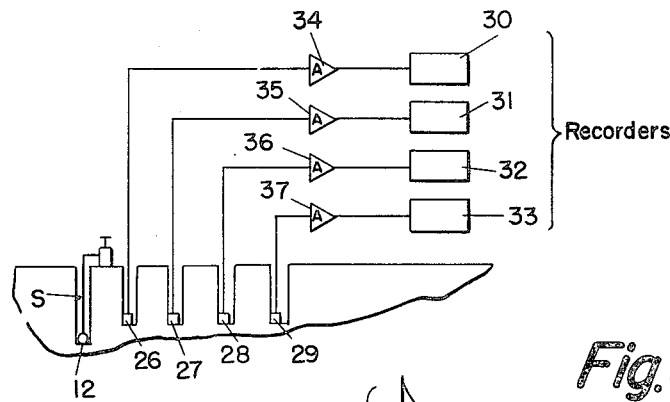
*Fig. 7a*
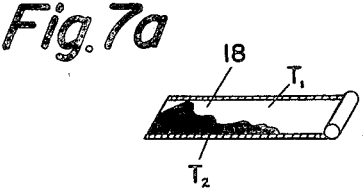
*Fig. 8a*
*Fig. 8b*
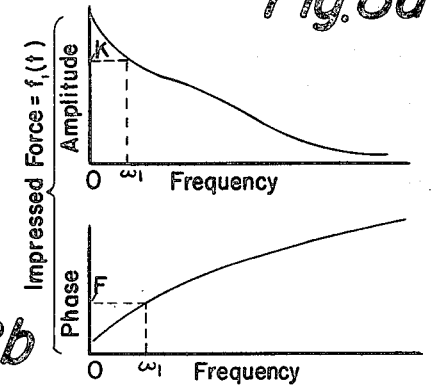
*Fig. 7b*
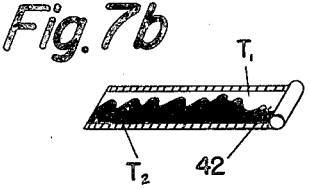
*Fig. 9a*
*Fig. 9b*
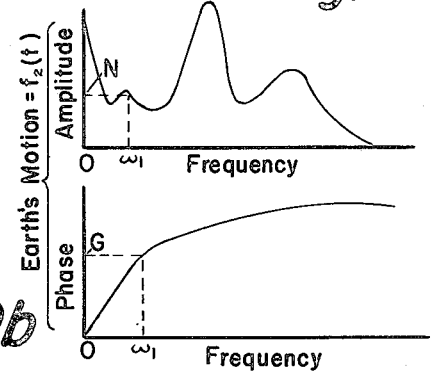
INVENTOR.
JACOB NEUFELD
BY
Sidney A. Johnson
ATTORNEY Dec. 14, 1954  J. NEUFELD  2,696,891
SEISMIC SURVEYING
Filed Nov. 26, 1951  9 Sheets-Sheet 3
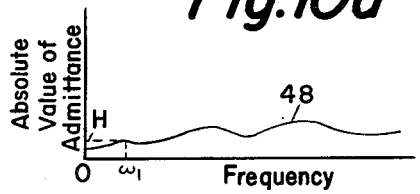
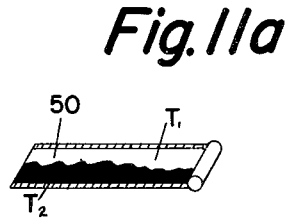
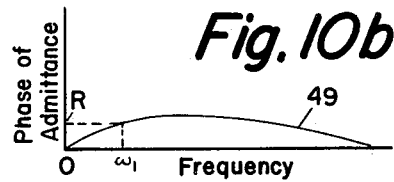
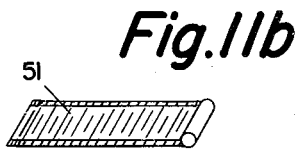
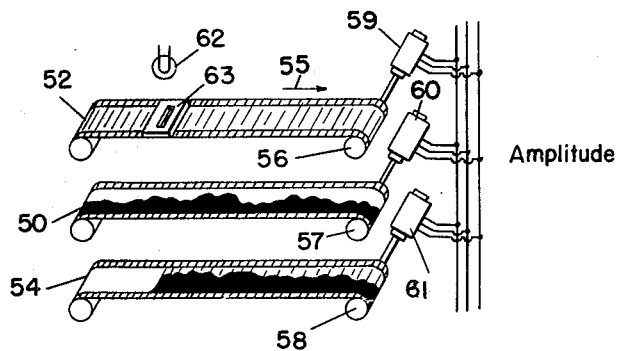
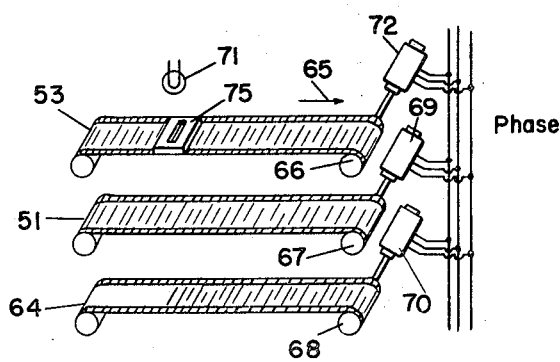
INVENTOR.
JACOB NEUFELD
BY
Sidney A. Johnson
ATTORNEY Dec. 14, 1954  J. NEUFELD  2,696,891
SEISMIC SURVEYING
Filed Nov. 26, 1951  9 Sheets-Sheet 4

INVENTOR.
JACOB NEUFELD
BY
Sidney A. Johnson
ATTORNEY

Dec. 14, 1954  J. NEUFELD  2,696,891
SEISMIC SURVEYING

Filed Nov. 26, 1951  9 Sheets-Sheet 5

INVENTOR.
JACOB NEUFELD
BY
Sidney A. Johnson
ATTORNEY

*INVENTOR.*
JACOB NEUFELD
BY
*Sidney A. Johnson*
ATTORNEY

Dec. 14, 1954   J. NEUFELD   2,696,891
SEISMIC SURVEYING
Filed Nov. 26, 1951   9 Sheets-Sheet 7
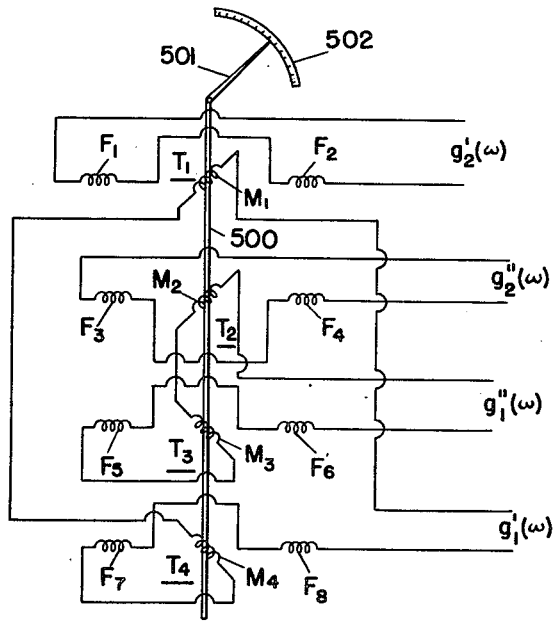
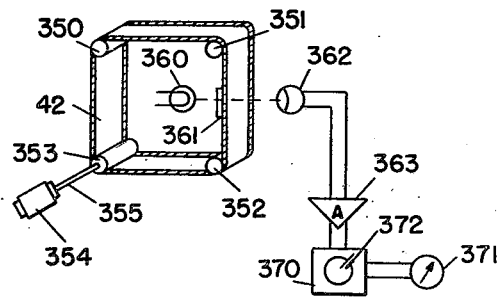
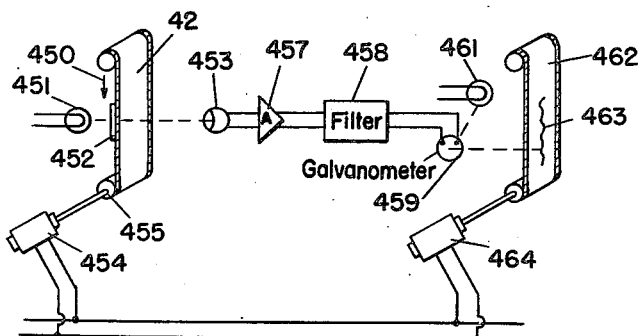
INVENTOR.
JACOB NEUFELD
BY
Sidney A. Johnson
ATTORNEY Dec. 14, 1954   J. NEUFELD   2,696,891
SEISMIC SURVEYING
Filed Nov. 26, 1951   9 Sheets-Sheet 8

INVENTOR.
JACOB NEUFELD
BY
Sidney A. Johnson
ATTORNEY

Dec. 14, 1954  J. NEUFELD  2,696,891
SEISMIC SURVEYING
Filed Nov. 26, 1951 9 Sheets-Sheet 9

INVENTOR.
JACOB NEUFELD
BY
*Sidney A. Johnson*
ATTORNEY

United States Patent Office 2,696,891
Patented Dec. 14, 1954

2,696,891

SEISMIC SURVEYING

Jacob Neufeld, Oak Ridge, Tenn.

Application November 26, 1951, Serial No. 258,121

21 Claims. (Cl. 181—0.5)

This invention relates to a new method of seismic surveying and has for an object the production of seismic records which represent the kind of waves which would travel from a shot point to a reception point if an arbitrary force that varies as a predetermined function of time were to be applied to the earth at the shot point.

In most of the successful applications of seismic technique, use has been made of earth vibrations of a transient character usually created by an explosive charge. The primary wave resulting from the explosion is propagated through the earth and is in part reflected, refracted and diffracted by the various changes in structure which it encounters. Portions of the reflected, refracted and diffracted waveforms return to the earth's surface. The returned portions of the wave are detected at a reception point spaced a known and substantial distance from the shot point. The detecting devices disposed along a predetermined line can be of any suitable type generally referred to as geophones and serve the purpose of generating electrical signals representative of the detected waves. The signals are amplified and recorded visually to present the character of the detected waves.

From a knowledge of the average velocities to given depths and the times of transit from the point of explosion to the geophone locations, computations are made as to depth, dip or other characteristics of the subsurface structures. These computations are performed by highly experienced geophysicists with a background of experience which enables them to derive valuable information from the seismograms, such, for example, as the dip of a certain subsurface geological formation by mere observation of the seismic records. Even for the experienced geophysicists, difficulty arises in judging which of a large number of recorded waves are true reflections.

For many years the only satisfactory method of imparting sufficient amounts of energy into the earth has been by the detonation of an explosive material, such as dynamite. However, when the explosion occurs, the energy is released in an uncontrollable manner. The time function representative of the resultant force impulse applied to the earth depends upon the nature of the explosive, the physical characteristics or the type of earth, and in general takes the shape of a damped oscillation of undesirably long duration. It also includes a "tail" in the form of release of undesirable parasitic energy, the force of which tends to obscure the reflections due to the initial and useful portion of the force applied to the earth resulting from the explosion. Were it possible to apply to the earth an initial-value function or one of the unit-function type, improved records could be obtained by the use of an explosive. It is an object of the present invention to produce seismograms corresponding with those which could be obtained were it possible to apply to the earth a force in the form of an initial-value function or one of the unit-function type.

In carrying out the invenion in one form thereof, there is determined a frequency spectrum of the admittance of the earth between the shot point and the reception point. One way of determining the admittance function, pursuant to the present invention, is to record as a function of time the force or energy impulses released by the explosive charge at a subsurface location adjacent the shot point but spaced therefrom far enough such that the elastic limit of the earth is not exceeded by the force at that subsurface location. The recorded impulse represents an input function and the resultant earth movement at the reception point or receiving station represents an output function. Both functions are complex in character. In accordance with the invention the force as represented by the waves received at the reference point adjacent the explosive charge are analyzed and there are recorded the amplitude spectrum and the phase spectrum thereof. Similarly, there are obtained from the waves received at the reception point the amplitude and phase spectrums thereof. The ratios of the amplitudes of the two amplitude spectra at various frequencies are obtained in determination of the amplitude characteristic of the admittance. The differences in the phases of the two spectra are ascertained in determination of the phase characteristic of the admittance.

Having thus obtained, preferably by Fourier analysis and preferably in terms of Fourier transforms, the admittance function, there can be combined with the admittance functions the amplitude and phase spectra of an idealized input function. The result of such a combination is then used to control generation of a signal to produce with respect to time the kind of a seismogram which would result from the application to the earth of such an idealized force. The several methods of practicing the invention and the typical apparatus utilized in connection therewith will be described in greater detail in the following description taken in conjunction with the accompanying drawings, in which:

Fig. 1 represents an arrangement for determining the input function with respect to time representing the force applied to the earth upon detonation of an explosive charge and also the output function with respect to time representing the corresponding earth motion at a reception point;

Fig. 2 illustrates a graph representative of the nature of the impulses detected at the reference point adjacent the explosive charge;

Fig. 3 is illustrative of a seismogram obtained by conventional seismic methods;

Fig. 4 is representative of seismograms obtainable in accordance with the present invention;

Figs. 5a and 5b are graphs respectively illustrating idealized arbitrary forces of the type which may be combined with the admittance function of the earth in procurement of seismograms of the type shown in Fig. 4;

Figure 13:
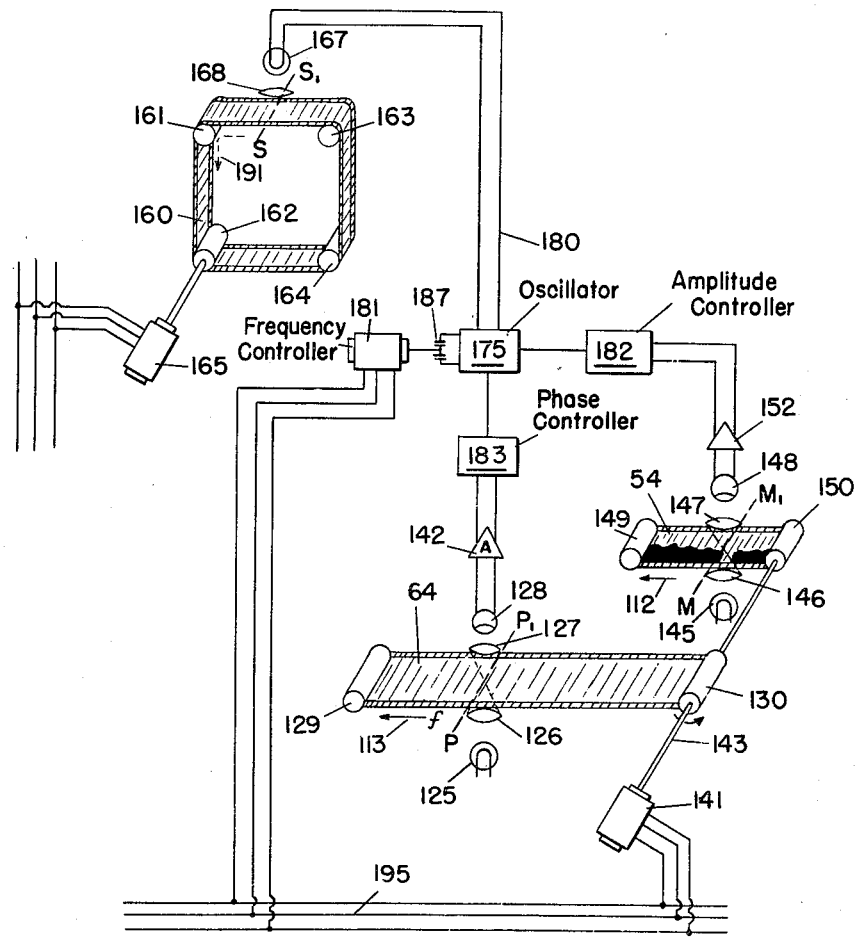
Figure 14:
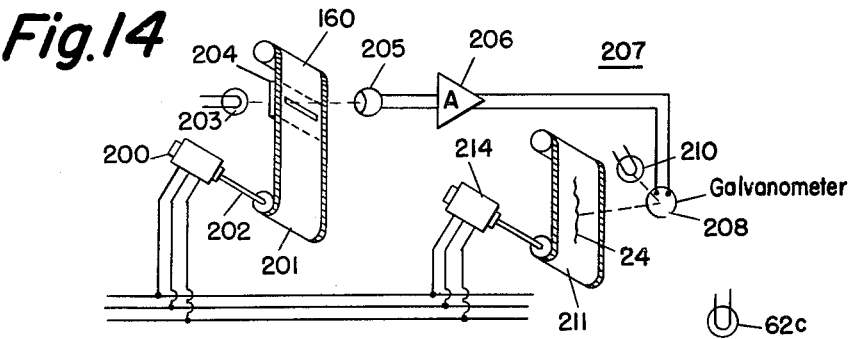
Figure 15:
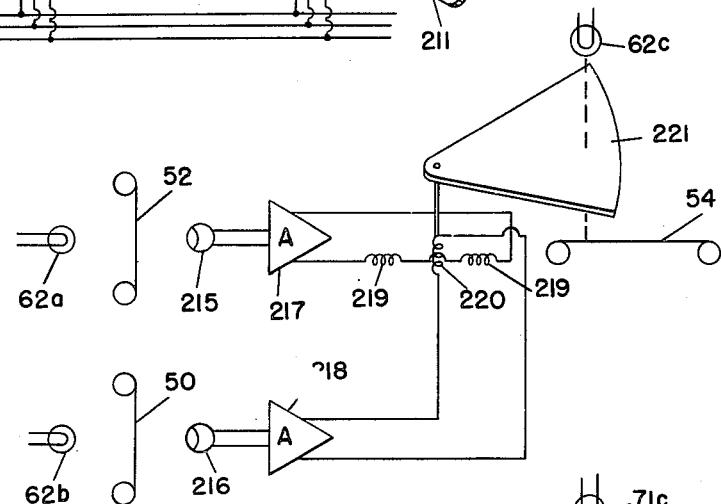
Figure 16:
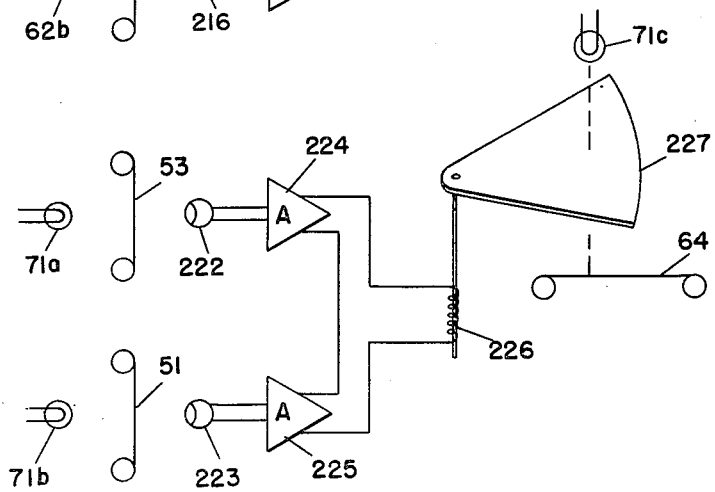
Figure 17:
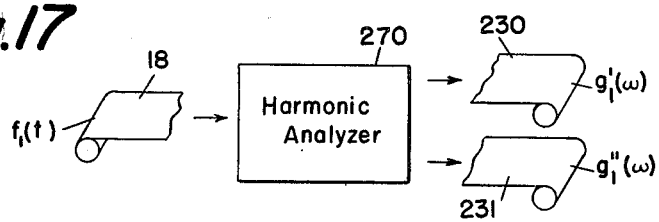
Figure 18:
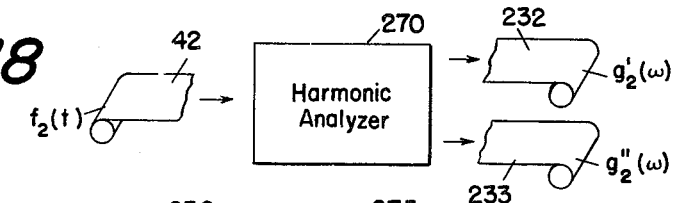
Figure 19:
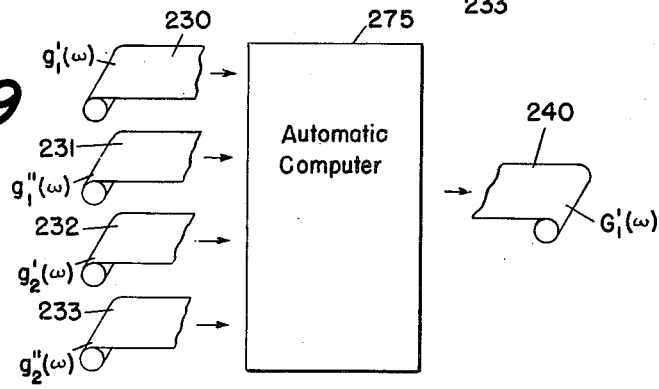
Figure 21:
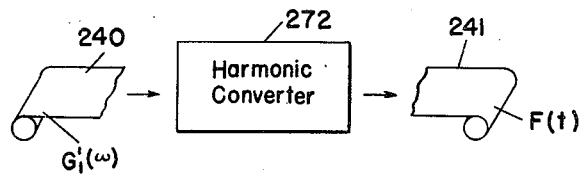
Figure 24:
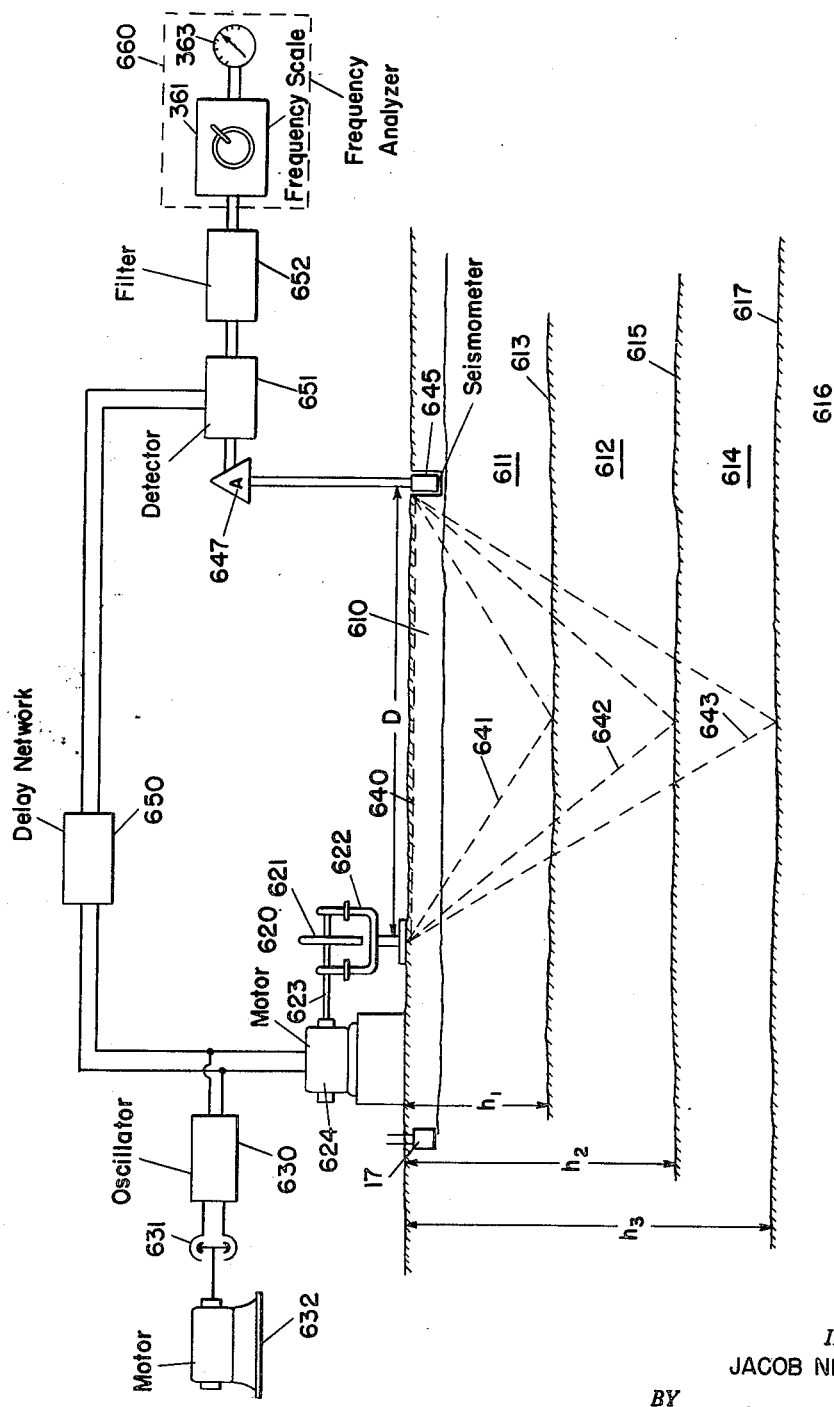
Figure 25:
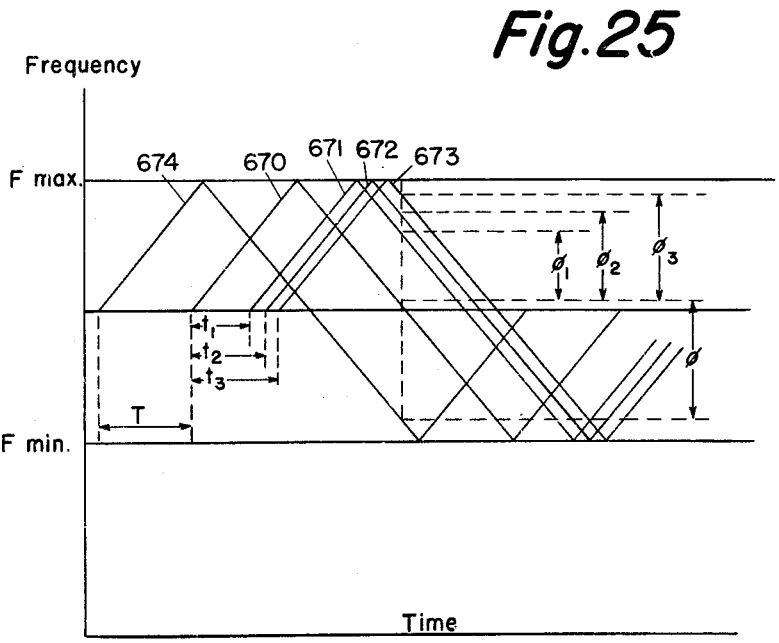
Figure 26:
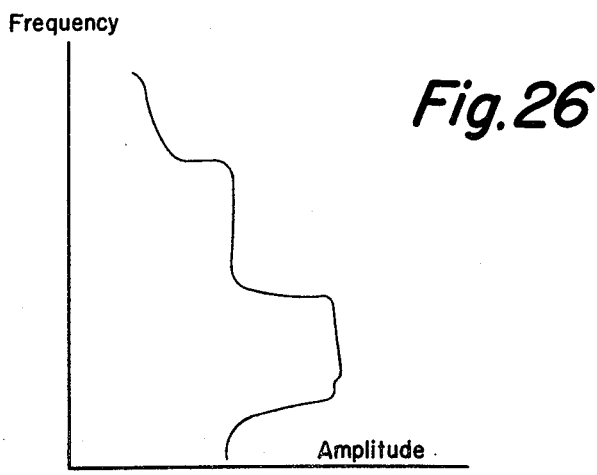

Fig. 6 schematically illustrates a system for determination of the location of the reference point or of geophone 17 of Fig. 1;

Fig. 7a illustrates a transparency element representative of the input function as detected by geophone 17;

Fig. 7b illustrates a transparency element representative of the output function as detected by the geophone at the remotely located reception point;

Figs. 8a and 8b respectively illustrate the amplitude vs. frequency and the phase vs. frequency of the input $f_1(t)$ representing the force applied to the earth by the explosive charge;

Figs. 9a and 9b illustrate the amplitude vs. frequency and the phase vs. frequency of the output function $f_2(t)$ of the earth movement as recorded on the transparency element of Fig. 7b;

Figs. 10a and 10b respectively illustrate the scalar or absolute value of admittance vs. frequency and the phase of admittance vs. frequency of the earth between the shot point and the reception point;

Fig. 11a illustrates a variable area transparency record representative of the function shown in Fig. 10a;

Fig. 11b illustrates a variable density transparency record representative of the functions shown in Fig. 10b;

Figs. 12a and 12b illustrate arrangements for deriving from the transparency records of Figs. 11a and 11b a Fourier representation of earth motion corresponding to any desired excitation;

Fig. 13 illustrates an arrangement for synthesizing a function when its Fourier components have been determined;

Fig. 14 illustrates an arrangement for translating a variable timing record into a visual record of the conventional seismogram type;

Fig. 15 diagrammatically illustrates a modification by means of which the functions represented by the records 50 and 52 may be multiplied one by the other;

Fig. 16 illustrates a modification of a different arrangement for subtracting the functions appearing on records 51 and 53;

Fig. 17 illustrates an arrangement for analyzing the input function $f_1(t)$ to obtain Fourier transforms representative thereof;

Fig. 18 illustrates an arrangement for analyzing the output function $f_2(t)$ to obtain Fourier transforms representative thereof;

Fig. 19 illustrates an arrangement for combining the transforms of input and output functions to produce a Fourier transform representative of the admittance function;

Fig. 20 illustrates an arrangement for analyzing the admittance function in producing a record representative of an idealized seismogram;

Fig. 21 illustrates an arrangement for performing harmonic analyses of the earth's admittance function;

Fig. 22 illustrates an arrangement for eliminating from the earth's admittance function certain undesirable frequencies;

Fig. 23 illustrates an arrangement for eliminating from the earth's admittance function certain undesirable frequencies;

Fig. 24 illustrates an arrangement from my earlier copending application to which the present invention is applicable; and Figs. 25 and 26 are explanatory graphs used in connection with Fig. 24.

Referring now to Fig. 1, there is shown a general field arrangement for performing a seismic survey. At a convenient point below the earth's surface 10 and in the weathered layer 11, there is placed in a shothole S a charge 12 of explosive such as dynamite which is detonated by a blaster 13 for the release, at a transmitting station 14, of acoustical energy which gives rise to a seismic disturbance producing seismic waves which travel through the earth. Those which travel downwardly are reflected from subsurface interfaces and upon arrival at a receiving station 15 may be detected by any suitable means such as a geophone 16. As already explained, the weathered or surface layer 11 of the earth in different sections of the country has quite different characteristics. In some localities it may be unconsolidated, whereas in other places it may be hard and compact, as in the case of limestone. In order to produce the release of acoustical energy of desired magnitude, the charge 12 of dynamite needed is always more than enough to produce a pressure in the bore hole exceeding the elastic limit of the adjacent earth formation. The elastic limit of the earth will, of course, depend upon its physical properties and will be lower with the unconsolidated layer 11 than with a consolidated layer, such as limestone. While geophones or seismometers have in the past been used in locations adjacent the shothole S, such uphole geophones or seismic detectors have been used for the determination of the velocity of sound in the weathered layer and also for the purpose of detecting the shot instant, that is, the instant of detonation of the explosive; they have not been either so situated as to be effective to detect or in fact used for detection of the character of the input function.

In accordance with the present invention, it is desired reproducibly to store, as by phonographic recording, the input function, that is, the variation of pressure over the interval of time in which explosive energy is released by the explosion of dynamite. Further in accordance with the invention, the nature of the complete input function is ascertained at a subsurface location in the earth a distance from the location of the charge such that the force created by the explosion will have been attenuated to a value which does not exceed the elastic limit of the adjacent earth formation.

In Fig. 1, the area A surrounding the charge 12 represents the region in which the magnitude of the force exceeds the elastic limit. However, during travel through that area, there is attenuation of the force, and by the time it reaches the boundary of area A its magnitude has been reduced or attenuated below that which will exceed the elastic limit of the earth. In a location outside of but adjacent to said area A, there is disposed a seismic detector or geophone 17 which will respond to the attenuated force or energy impulse. The character of that force, the input function, is faithfully reproducibly stored or recorded in any suitable manner, as by a light-sensitive film 18 upon which there is directed by an oscillographic element 19 a beam of light from a source 20. The element 19 may comprise a string galvanometer including a mirror which deflects the light beam on the record film or sheet 18 which, being moved at constant speed by motor $a$, records the character of the force with high fidelity. If desired, an amplifier 21 may be included between the geophone 17 and the oscillographic element 19 with the volume or amplitude control adjusted to maintain the record on the film 18 of chosen amplitude.

In Fig. 2 there has been illustrated by the curve or graph 22 plotted time as abscissae and pressure variations as ordinates. The variations in the force, i. e., the pressure of the pulse of energy, are detected by the geophone 17 located in the region in which the elastic limit of the earth has not been exceeded. It will be observed that upon the instant of detonation ($t=0$), the force or pressure rises very rapidly, more slowly decays, crosses the axis, rises slightly, and then the pressure disappears.

It is important to understand the reason for the location of the geophone 17 at a suitable distance from the charge 12. By so locating it within the region in which the elastic limit of the earth is not exceeded, the earth may be considered as a linear system. Accordingly, the variation in pressure as represented by the curve 22 corresponds with the input function $f_1(t)$, always within the elastic limit of the earth and is applied to the earth which may then be assumed to perform as a linear system between geophones 16 and 17 of Fig. 1.

In seismic surveying as heretofore practiced, it is believed that the recorded reflections and refractions have to large extent been produced by the initial portion of the force or pressure pulse, as for example, that portion between $t=0$ and the instant $t_1$. This portion between $t_0$ and $t_1$ may be designated as the "useful" portion, whereas the remaining portion from $t_1$ to $t_2$ may properly be designated as a "parasitic" portion. It is called "parasitic" because representative of that part of the force or pressure impulse, Fig. 2, which is undesired but which, nevertheless, produces additional reflections and refractions which modify the main reflections and refractions produced by the useful portion of the pulse at geophone 16, to the extent of making the record difficult, if not impossible, to interpret.

If reference now be made to Fig. 3 where there is shown a single trace 23 of a seismogram, the shot instant at $t_0$ will be seen at 23a followed by a series of seismic waves in which reflections may or may not be present. The seismogram is itself obscure as to the presence of reflections and is further obscure as to the instant of time of arrival at the detecting geophone 16 of any presumed reflection. It is the purpose of the present invention to produce seismograms in which the reflections appear in sharp relief and in which there has been eliminated the obscuring or modifying effect of the undesired or parasitic portion of the input pulse and of random vibrations generally referred to as earth noise.

It is to be understood that Fig. 2 is illustrative of the type of pressure wave resulting from an explosive charge in a particular locality. The character of the pulse or input function will vary depending not only upon the physical characteristics of the earth in the region of the charge of dynamite, but also upon the extent of the displacement of earth strata adjacent the dynamite and the usual tamping provided as by a column of water in the shothole. In many instances where a series of single-charges are exploded in the same hole, the first or subsequent charges of explosive will "blow out" the bottom of the shothole, the enlarged cavity thus formed greatly changing the performance characteristic of the earth immediately adjacent the charge, and thus greatly affecting the shape or character of the energy impulse delivered to the earth by detonation of subsequent single-charges of dynamite. Thus, many variables affecting the seismograms are introduced into seismic surveying as presently practiced.

As will be later explained, a seismogram, such as shown by the trace 24 of Fig. 4, will be produced in accordance with the present invention as though there had been applied to the earth a unit impulse or an initial value function 25, as shown in Fig. 5, in which seismogram following the shot instant 24a and the first-arriving energy 24b, there will appear with great resolution sharply defined reflections 24c—24e in contrast with the obscure record of Fig. 3.

The location of the geophone 17 as regards its distance from the charge 12 may be determined in several ways, in accordance with the present invention, such as by the arrangement illustrated in Fig. 6, where a series of geophones or seismic detectors 26—29 are uniformly spaced from the charge 12. Upon detonation of charge 12, records are made by recorders 30—33 of the signals from each of the geophones, with amplifiers 34—37 adjusted as may be necessary to produce distinctive records on each of the respective recorders. In the region adjacent the shothole S, the time of arrival of the pressure wave from shothole S to the first geophone will differ from the time of arrival of the wave to the geophone 27 by a factor of more than two, though the distance of geophone 27 from geophone 26 be exactly that of geophone 26 from the charge. However, in the horizontally disposed array of geophones 26—29, the arrival times as between subsequent geophones will be exactly proportional to their respective distances from the charge as soon as the applied force has been attenuated to a value which does not exceed the elastic limit of the earth.

In areas of a consolidated nature, such as the Eagle Ford shale, a near-surface formation covering a considerable area in central Texas, the interval velocity between adjacent geophones was found to be constant for geophones located 20 feet and more away from a one-pound dynamite charge. Thus, for seismic surveys in that area and with one-pound charges of dynamite, the geophone 17 of Fig. 1 would be located a distance somewhat greater than 20 feet from the charge, and it would not be necessary to utilize the field technique described in connection with Fig. 6 until a different earth formation were encountered. It will be remembered that the sphere of fracture of the earth formation increases with unconsolidated surface formations, such as ordinary earth and the like.

While the field technique, as explained, is a satisfactory method of determining the spacing of geophone 17 from the charge, that spacing can also be determined by measurement of the actual pressure generated in the shothole, as for example, by means of a device of the character shown and described in Clewell Patent No. 2,548,947, and thereafter calculating the distance from the shot needed to establish a linear stress-strain relationship. Such calculations, of course, require information as to the physical characteristics of the earth adjacent the shothole, the principal one being its tensile strength, for the reason that formations surrounding the hole apparently exhibit hoop tension in resisting the pressure set up by the explosion and, hence, there must be attenuation of the explosive pressure below that which will exceed the hoop tension.

Again referring to Fig. 1, the signals detected at the remotely located receiving station by geophone 16 are amplified by amplifier 40, and by means of oscillographic element 41 produce on a record film 42 a seismogram, such for example as the one illustrated in Fig. 3. As at the transmitting station 14, there is provided a light source 43 at the receiving station 15 which directs a beam of light upon the mirror of a string galvanometer forming the oscillographic element 41. A motor b is provided to drive the record sheet 42 at a uniform speed. Thus, the seismogram recorded on the film or sheet 42 will represent the output function $f_2(t)$.

Since the input function $f_1(t)$ is taken in that region of the earth which is linear with respect to the applied force, the earth between the transmitting station 14 and the reflecting horizons or interfaces and the receiving station 15 may be considered as linear. Hence, the admittance function of the earth including the reflecting interfaces and including the factors illustrative of its behavior may be ascertained by dividing the output function by the input function.

It is to be understood that any method of recording or storing the input and output functions may be utilized so long as such functions may be reproduced. Seismograms of the type shown in Fig. 3, available for many sections of the country, represent output functions and may be considered reproducible since they may be converted to electrical signals and stored for reproduction as by a tape recorder, even though in such method it might be necessary manually to convert such records to ones of reproducible character. Each trace may be converted to a record of the variable area type.

As shown in Figs. 7a and 7b, the films 18 and 42 are illustrated as the variable area type, that is to say, as the amplitude of each function varies, the exposed or opaque area of the film or record from one edge to the other is correspondingly changed. Thus, the light transmission through the remaining part of the film varies with amplitude. Such records can be produced in the manner shown in Fig. 1 with proper adjustment of the optical system. It is, of course, to be understood that variable-density films may be used where the intensity of a lamp varies, with amplitude changes, the light transmissivity of the film. Similarly, a magnetic tape, a wire, or a disc and stylus may be used to record the input and output functions, and in general any reproducible phonographic recording method will be suitable. By phonographic, I mean a record which can be used to produce electrical impulses or mechanical movements in reproduction of the recorded vibrations.

For convenience of illustration, these transparencies 18 and 42 have been shown in Figs. 7a and 7b as comprising bases having a uniform coefficient of light transmission $T_1$. The area of the base up to the given curve is darkened until it has a uniform coefficient of light transmission $T_2$.

In the taking of the records 18 and 42, the motors $a$ and $b$, Fig. 1, are both energized prior to the operation of the blaster 13 and such motors continue to operate until after the completion of the seismogram illustrated in Fig. 3. The beginning of a change in the exposure of an area of the record 18 will, of course, mark the shot instant which corresponds with $t=0$ of Fig. 2. Similarly, in manner well understood by those skilled in the art, the time $t=0$ of Fig. 3 will be marked by the appearance on the record 42 of Fig. 7b of an exposed area of the pulse 23a which is the shot instant. The record 42 will, of course, have a length as indicated by the dimensional arrow $L_1$ of Fig. 3 great enough to include the shot instant and all or a selected part of the seismic signals detected by geophone 16. The film 18 of the input function $f_1(t)$ will then be made the same length as $L_1$ with time at the beginning and end thereof corresponding with the tips of the dimensional arrows defining $L_1$.

As previously indicated, the function $f_1(t)$ is representative of the input function with respect to time corresponding with the sudden release of acoustical energy which results in the application to the earth of a force, as by the dynamite explosion. Similarly, $f_2(t)$ is representative of the output function with respect to time and it is reproducibly stored or recorded as a result of the detection of seismic waves by the geophone 16 at the receiving station 15.

Since each of the functions $f_1(t)$ and $f_2(t)$ is complex in character and neither lends itself to direct use in determining admittance, it is necessary carefully to treat them as complex quantities in the further use made of them. Accordingly, there will be applied to them the operations of a Fourier analysis not only as mathematical justification for the methods and systems by means of which improved seismograms are obtained, but also to present an understanding of how the division of the output function by the input function may be attained and use made thereof in producing improved seismograms.

It will be assumed that $A(\omega)$ represents the admittance of the earth has a complex function of frequency. Hence, there will be determined:

$$A(\omega) = \frac{\text{The output function } f_2(t) \text{ converted to a frequency base}}{\text{The input function } f_1(t) \text{ converted to a frequency base}}$$

To convert the spectral distribution of the function $f_1(t)$, Fig. 2, to a frequency base, the operations of a Fourier analysis are utilized. The input function $f_1(t)$ can be represented by means of the Fourier integral. This integral can be approximated by means of series as follows:

$$f_1(t) = \sum_n C_{1n} \cos(\omega_n t + \theta_{1n}) \qquad (1)$$

Similarly, the output function $f_2(t)$ can be approximated by means of Fourier series as follows:

$$f_2(t) = \sum_n C_{2n} \cos(\omega_n t + \theta_{2n}) \qquad (2)$$

where the values $$\omega_n = \frac{L_1}{2\pi n}$$

for $n = 1, 2, 3, 4 \ldots$ etc. ($L_1$ is the length of the seismic record);

$C_{1n}$ represent the amplitudes of various frequency components in the spectrum of $f_1(t)$;

$\theta_{1n}$ represent the phases of various frequency components in the spectrum of $f_1(t)$;

$C_{2n}$ represent the amplitudes of various frequency components in the spectrum of $f_2(t)$; and $\theta_{2n}$ represent the phases of various frequency components in the spectrum of $f_2(t)$.

The values of the amplitudes $C_{1n}$, $C_{2n}$ and of the phases $\theta_{1n}$, $\theta_{2n}$ can be determined by means of a harmonic analyzer such as the one described in United State Patent No. 2,098,326 on a "calculating device" issued to E. C. Wente on November 9, 1937, or by means of other available harmonic analyzers well known in the art, such for example, as the Type 736-A Wave Analyzer as manufactured by the General Radio Company, or by means of a harmonic analyzer later to be described more in detail.

Still another analyzer is described in "Electronic Engineering," February 1951, pages 67–69, this analyzer also providing both amplitude values and phase angle determinations.

In Fig. 8a there is illustrated the frequency-amplitude spectrum of the impressed force $f_1(t)$ of Fig. 7a, while Fig. 8b illustrates the phase-frequency spectrum of the impressed force or input function $f_1(t)$. Similarly, Figs. 9a and 9b respectively represent the amplitude-frequency spectrum of the earth motion or output function $f_2(t)$ and the phase-frequency spectrum thereof, which output function is shown in Fig. 7b.

As already explained, the earth upon application to it of the input function $f_1(t)$ behaves as a linear dynamic system, that is, one which may be represented by means of a linear differential equation. Consequently, the behavior of the earth as a transmitting medium between the shot point, the transmitting station, and the detecting point or receiving station, can be determined for each separate frequency component of the spectrum. More particularly, the Fourier component having a frequency $\omega_1$ contained in the spectrum of the applied force $f_1(t)$ is indicated in Figs. 8a and 8b. Its amplitude is equal to OK and its phase is equal to OF. The frequency component $\omega_1$ is also present in the spectrum of the earth motion or in the output function $f_2(t)$ as will be seen by inspection of Figs. 9a and 9b. Its amplitude is equal to ON and its phase is equal to OG. Consequently, the earth considered as a transmitting medium has the effect of translating the applied sinusoidal force of frequency $\omega_1$ having amplitude OK and phase OF into corresponding sinusoidal earth motion of the same frequency having amplitude ON and phase OG. Therefore, the admittance of the earth at frequency $\omega_1$ has the value $$\frac{ON}{OK}$$

and a phase angle of (OG−OF). The absolute value of the admittance at frequency $\omega_1$ is shown in Fig. 10a in which the ordinate OH corresponding to the abscissa $\omega_1$ is equal to $$\frac{ON}{OK}$$

Similarly, the phase of the admittance at frequency $\omega_1$ is shown in Fig. 10b to be equal to OR which, of course, is also equal to (OG−OF).

By repeating the above operations for each of the frequencies within the spectral bands, the curve 48 of Fig. 10a is obtained and it represents the absolute value of the earth's admittance at various frequencies $\omega$. The corresponding ordinate of curve 48 for any value of $\omega$ represents the ratio of the ordinates, for the same value of $\omega$, of the curves of Figs. 9a and 8a respectively. Similarly, the curve 49 of Fig. 10b will represent the phase angle of the earth's admittance over the same range of frequencies $\omega$. The corresponding ordinate of curve 49 for any value of $\omega$ represents the difference between the ordinates, for the same value of $\omega$, of the phase versus frequency graphs of Figs. 9b and 8b respectively.

Figs. 11a and 11b illustrate variable transparency films 50 and 51 representative of the functions shown in Figs. 10a and 10b respectively. It is to be noted that film 50, Fig. 11a, is of the variable area type representing the variation of the value of the earth's admittance with frequency, while the film 51, Fig. 11b, is of the variable density type representing the variation in the phase of the earth's admittance with frequency. The lengths of the films 50 and 51 will be the same and will cover corresponding frequency ranges.

Now that the earth's admittance has been determined, which varies in the complex manner indicated by Figs. 10a and 10b, and by Figs. 11a and 11b, there may now be determined the nature of the earth's motion which will result from an impressed force or an input function of any desired character. Instead of an input function of the type illustrated in Fig. 2 including the useful portion and the parasitic portion, there may be ascertained the earth movement which would occur as the result of the application thereto of a selected or arbitrary force of the "impulse" type, that is, one represented by an initial value function shown in Fig. 5a, or one of the "unit function" type shown in Fig. 5b. A force of the impulse type represents one suddenly applied at the time $t_0$ and removed shortly thereafter at a subsequent instant $t_1$. A force of the "unit function" type corresponds with one suddenly applied at an instant $t_0$ and maintained thereafter. If the impulse of Fig. 2, a complex input function, be replaced by an applied force of the type shown in Fig. 5a or Fig. 5b, the resulting earth motion will not include the components due to the parasitic portion of the impulse of Fig. 2 and, hence, a seismogram-trace of such earth motion will resolve with greater fidelity any reflections present and correspondingly enhance the value of seismograms thereby attained.

In order to determine the earth motion F(t) resulting from a selected impulse force, such for example as the initial value function of Fig. 5a, it will first be necessary to translate the amplitude versus time graph of that input function to a frequency base to ascertain the spectral distribution thereof. Such a step is necessary to convert the idealized input function to a form which may be utilized in connection with the complex expression of admittance represented by the curves of Figs. 10a and 10b. The conversion to the frequency base will be accomplished in the same manner as above described in converting the input function $f_1(t)$ of Fig. 7a to its amplitude versus frequency components and to its phase versus frequency components respectively illustrated in Figs. 8a and 8b. Signals representative of phase and amplitude will then be stored on phonographically reproducible records such as on variable density films. Such records have been illustrated on films 52 and 53 in Figs. 12a and 12b. More specifically, the film 52 provides a variable density record representing the amplitude-frequency distribution of the idealized impulse shown in Fig. 5a, and the film 53 provides a variable density record representing the phase-frequency distribution of the same impulse.

It will be observed that in Fig. 12a the films 50 and 52 are located one above the other and in alignment with an initially unexposed film 54. All films synchronously move in the direction of the arrow 55 by means of sprockets 56—58 respectively rotatable by synchronous motors 59—61. A lamp 62 provides illumination directly through a slit 63 for downward direction of a light beam that traverses films 52 and 50 and exposes in accordance with their relative density or light transmissivity the film 54.

The film 52, it will be remembered, represents the amplitude-frequency distribution of the Fourier spectrum of the initial value function of Fig. 5a. It will also be remembered that the film 50, of the variable area type, represents the functional relationship between the absolute value of the earth admittance and the corresponding frequency components. It is apparent that by multiplying any frequency component of the impressed force, as shown in Fig. 5a by the corresponding frequency component of the earth's admittance, as shown in Fig. 10a, there is attained a corresponding frequency component in the Fourier spectrum representative of the resulting earth motion.

The arrangement of Fig. 12a accomplishes the multiplication of the magnitudes represented on films 52 and 50. Since one, the film 52, is of the variable density type and the other, the film 50, is of the variable area type, the total amount of light absorbed by the films 50 and 52 represents the product of the two functions impressed upon said films.

Referring now to Fig. 12b, there is indicated an arrangement for producing a variable transparency film 64 representing the phase-frequency distribution of the earth movement resulting from application thereto of the input function illustrated in Fig. 5a. The films 53 and 51 and the initially unexposed film 64 move in the direction of the arrow 65 by means of sprockets 66—68 rotatable in synchronism by synchronous motors 72, 69 and 70. A lamp 71 provided with the directing slit 75 transmits downwardly a light beam which traverses the films 53 and 51 and impinges upon the initially unexposed film 64. It will be recalled the film 53 represents the phase-angle frequency distribution in the Fourier spectrum of the applied pulse of Fig. 5a, while the film 51 represents the phase-angle frequency distribution in the Fourier spectrum of the earth's admittance. By adding, throughout the frequency spectrum, the phase angle of the component of the impressed force to the phase angle of the corresponding component of the earth's admittance, there is obtained the phase angle distribution of a corresponding component in the Fourier frequency spectrum representative of the resultant earth motion. Since the films 53 and 51 are of the variable density type, the amount of light absorbed by these films (through a subtractive operation) produces a result representative of the sum of the two functions impressed upon them. Consequently, the record on film 64 of the variable density type will be representative of the frequency-phase distribution of the earth motion.

It is important to note that by applying my concept of an idealized input function of unity, the steps described in connection with Figs. 12a and 12b may be omitted. In that case, the films 50 and 51 may be utilized directly in the same manner as will now be described for the films 54 and 64.

The final step is to derive from the functional representations of films 54 and 64 of Figs. 12a and 12b the function representing the earth movement F(t) with respect to time. Referring now to Fig. 13, there is illustrated an instrument adapted to produce a graph representing a synthesis of the functions obtained on the developed films 54 and 64 of Figs. 12a and 12b. The record on film 54 represents frequencies lengthwise thereof, which frequencies increase in the direction of the arrow 112, while the varying transparency of the film represents as ordinates the amplitudes against frequency as abscissae. Similarly, the film 64 represents frequencies as abscissae taken lengthwise or along the longitudinal axis of the film with frequencies increasing in the direction of arrow 113. The varying transparency of film 64 represents as ordinates the phase for each frequency.

The films 54 and 64 in Fig. 13 have reproducing systems associated therewith. The one for the film 64 comprises a light source 125, lenses 126, 127, and a photocell 128. It will be observed that the film 64 is advanced or moved with respect to the photocell 128 in a direction opposite that of the frequency-indicating arrow 113, a drive sprocket or takeup reel 130 driven by a motor 141 through shaft 143 being provided to advance the film 64 supplied from reel 129. Variations in light impressed upon the photocell 128 are translated into electrical currents which are fed into an amplifier 142. These electrical currents, amplified by amplifier 142, vary in accordance with change in the transparency of film 64 and successively represent phase-angle values of the components in the frequency spectrum of the function obtained in accordance with Fig. 12b.

Similarly, the reproducing system for the film 54 comprises a light source 145, lenses 146 and 147, and a photocell 148. These elements translate the variable area track on film 54 supplied from reel 149 and taken up by a sprocket or reel 150 into currents having amplitudes corresponding with the varying track or exposed area of film 54. The film 54 is advanced in the same direction as film 64, namely, in a direction opposite to that of the arrow 112 as by the drive sprocket 150 driven by the motor 151 through the shaft 143. The electrical currents from the photocell 148 are amplified by amplifier 152 whose output represents the values of amplitudes of the successive components of the function obtained by means of Fig. 12a.

The instrument of Fig. 13 includes an initially unexposed film 160 shown in the form of a closed loop which may be set into rotary motion by means of sprocket wheels 161—164, one of which, the sprocket 162, is driven by means of a motor 165. A lamp 167 is positioned adjacent the film 160 and projects upon it by means of a lens 168 a light beam, the intensity of which is dependent upon the intensity or magnitude of the electrical current supplied to the lamp. The magnitude of that current is controlled in accordance with the current output from an oscillator 175. In order to simplify the drawing as much as possible, slits such as 63 and 75 of Figs. 12a and 12b have been omitted in Fig. 13 but are symbolically represented by the lines P, $P_1$; M, $M_1$ and S, $S_1$ later to be referred to.

The oscillator 175 may be of any conventional type adapted to produce across its output circuit 180 a sinusoidal wave. As shown, the oscillator is of a controllable type and is provided with three control elements 181, 182 and 183 adapted respectively to control the frequency, the amplitude and the phase of the output voltage appearing at the output circuit 180. There are several well known methods in the art for controlling frequency, phase and amplitude of sinusoidal waves generically illustrated in the diagram of Fig. 13 by the blocks 181, 182 and 183.

There will now be considered the operation of the instrument of Fig. 13 at that instant in which the portions of films 54 and 64 that are directly above the light sources 145 and 125 are as shown in the drawing and designated therein by the horizontally extending lines M, $M_1$ and P, $P_1$. The amount of light received by photocell 148, and consequently the amplitude of the signal as the control voltage applied to the control element 182, will depend upon the transparency of the portion along the line M, $M_1$. The control element 182 responsive to the control voltage derived from the photocell 148 is applied to the oscillator 175 in manner to adjust the amplitude of its sinusoidal output to a value representative of the transparency of film 54 at the portion M, $M_1$.

The amplitude of the control voltage applied by way of photocell 128 and amplifier 142 depends upon the transparency of the film 64 at the region P, $P_1$. The amplitude of the voltage applied to the element 183 adjusts the phase of the sinusoidal output of oscillator 175 to a value representative of the transparency of film 64 along the line P, $P_1$.

The frequency of the oscillator 175 can be controlled in any suitable manner as by means of a tuning condenser 187, the rotatable element of which is mounted upon a shaft 188 driven by a motor 181 which may be energized from the same current supply 195 as the motor 141. Preferably, the motors are of the synchronous type and rotate synchronously at a relatively low speed. Accordingly, it will be seen that for every angular position of the rotatable element of the condenser 187 there will be a different but corresponding linear portion of the films 54 and 64 beneath photocells 128 and 148. Thus, for each incremental length of these films there will be a corresponding incremental change in the frequency of the oscillator 175. The condenser 187 and its associated frequency-controlling elements vary the frequency of the oscillator 175 linearly with respect to the linear movement of films 54 and 64 relative to the photocells 128 and 148.

At the instant under consideration the frequency of the output of oscillator 175 is determined or fixed by the illustrated angular position of condenser 187. The amplitude of that output is, of course, determined by the transparency of film 54 at the area M, $M_1$, while the phase of the oscillator output is determined by the transparency of film 64 at the portion P, $P_1$.

For purposes of explanation, it will now be assumed that the angular position of condenser 187 is stationary during a time interval $\Delta t$ of sufficient length to permit the film 160 in the form of an endless loop to effect one complete rotation relative to the lamp 167. As shown, the area or region of the film 160 receiving light from the lamp 167 has been indicated by the broken line S, $S_1$. The loop of film 160 is rotated by motor 165 in a counter-clockwise direction as indicated by the broken line arrow 191. Accordingly, for one rotation of film 160 from the starting point S, S₁ and back to the starting point S, S₁, light from lamp 167 will be directed to the film 160 having an intensity corresponding with the amplitude of the frequency component determined by the angular position of condenser 187, that amplitude being determined by the transparency of the film portion M, M₁ and the phase being determined by the transparency of film portion P, P₁.

Now that one rotation of film 160 has been assumed to have taken place in the time interval $\Delta t$, it will now further be assumed that tuning condenser 187 has been rotated a small amount to occupy a new angular position which may be designated $\alpha_1$ immediately adjacent to its initial position which may be designated $\alpha_0$. Accordingly, the output voltage delivered by the oscillator 175 will have a new frequency $f_1$, such that $$\frac{f_1}{f_0}=\frac{\alpha_1}{\alpha_0} \tag{3}$$

where $f_0$ is the initial frequency.

With each incremental change in the position of condenser 187, there are like incremental changes in the portions of films 54 and 64 beneath photocells 148 and 128. Accordingly, with the changed position of condenser 187 and of the frequency of oscillator 175, there likewise occurs, with change in transparencies of films 54 and 64, a change in the phase of the output of oscillator 175 as determined by the changed transparency of film 64 and a change in the amplitude dependent upon the changed transparency of film 54. Film 160 is again driven through one revolution during a time interval equal to $\Delta t$. During the second rotation of film 160, the film receives an exposure dependent upon a further frequency component of the amplitude and phase functions represented by the portions of films 54 and 64 directly opposite their respective photocells 148 and 128.

Similarly, after each succeeding time interval $\Delta t$, the rotary condenser 187 can be angularly displaced by further incremental amounts to immediately adjacent angular positions $\alpha_2$, $\alpha_3$, $\alpha_4$, etc. The output voltage delivered by the oscillator 175 will then have new frequencies $f_2$, $f_3$, $f_4$, etc. such that $$\frac{f_2}{f_0}=\frac{\alpha_2}{\alpha_0};\ \frac{f_3}{f_0}=\frac{\alpha_3}{\alpha_0};\ \frac{f_4}{f_0}=\frac{\alpha_4}{\alpha_0};\ \text{etc.} \tag{4}$$

Accordingly, amplitudes of the sinusoidal waves delivered by the oscillator 175 will be determined by the portions of film 54 that come opposite the photocell 148 during the incremental movement of said film toward the takeup reel 150. The phases will be determined by the incremental portions of the film 64 which come opposite the photocell 128 during the incremental movement of that film toward the takeup reel 130.

From the foregoing, it will be apparent that at the beginning and at the end of each succeeding time interval $\Delta t$, the loop 160 will assume its initial position such that the line S, S₁ is directly beneath the lamp 167 and that during the succession of time intervals, the loop 160 will receive the impressions of the frequency components having frequencies $f_1$, $f_2$, $f_3$, etc.

The recording system comprising the lamp 167 and the loop or film 160 records the summation of the individual impressions made by each Fourier component.

In the foregoing explanation, the assumption was made of abrupt movement of condenser 187 at a succession of time intervals each equal to $\Delta t$, the respective angular displacement having been designated by $\alpha_1$, $\alpha_2$, $\alpha_3$, etc. and further that the oscillator 175 suddenly changed the output wave at the end of each such time interval. It is not necessary that the process be performed in the stepwise manner described. The foregoing step may be performed continuously and as illustrated the motor 181 very slowly drives the condenser 187, the motor 141 rotating synchronously therewith. Accordingly, the output of the oscillator 175 will be varied continuously and in synchronism with rotation of the condenser 187 and will generate in succession substantially all of the frequency components entering into the frequency spectrum of the function of the earth motion, $f_2(t)$. However, the motor 165 driving the loop or film 160 is driven at an angular speed that is very high in comparison to the low speed operation of the motors 141 and 181. Consequently, the rapidly moving loop or film 160 will receive in succession sinusoidal waves representing Fourier components generated by the oscillator 175. These waves superimpose themselves upon the film 160 and produce a resultant wave which represents the summation of all components. In consequence, there is obtained a variable density record on the film 160 that represents a synthesis of the respective functions appearing on films 54 and 64. After development of the film 160, the variable density record or track thereby obtained as a result of the synthesis just described may be used to produce a new seismogram in the following manner.

Referring to Fig. 14, the film 160 is illustrated as traveling downwardly from the supply roll to the takeup reel 201 driven by a motor 200 connected to a shaft 202 extending from the reel. An electrooptical system comprises an incandescent lamp 203 arranged to project a beam of light on the film 160 as it passes by a slit member 204. The beam of light which passes through the film impinges upon a photocell 205 located opposite the slit member 204. As the film 160 is moved from the supply roll to the takeup reel, the amount of light absorbed by the film is varied in proportion to the density of the record or track thereof. Consequently, the result is the production by the photocell 205 of a signal which varies in amplitude with the synthesized signals which the track or record on film 160 represents. The output of the photoelectric cell 205 is amplified by an amplifier 206 and the output applied to a recorder 207. The recorder preferably includes a field magnet (not shown) and an oscillographic element 208 which is preferably rather well damped. A mirror carried by the oscillographic element 208 directs from an incandescent lamp 210 a light beam towards a film 211 and deflects it relative thereto dependent upon the amplitude of the signals applied to it. A motor 214 driven synchronously with the motor 200 moves the light-sensitive strip past the element 208 to receive a record which varies with amplitude of the signals. Upon the light-sensitive film 211 there is produced a trace 24 which visually reproduces the variations in output of the photoelectric cell 205 with respect to the longitudinal coordinate of the film 160. The trace 24 is representative of the earth motion when subject to a function of the type shown in Fig. 5a; and as already explained in connection with Figs. 3 and 4, there is produced in Fig. 4 a considerably improved seismic record. There is thus provided a method of producing with greater resolution the reflections which may be quite obscure on seismograms obtained by conventional seismic surveying methods.

In the modification of Fig. 15, the function recorded on film 50 is multiplied by the function recorded on film 52 by means of photocells 215 and 216, the outputs of which after amplification by amplifiers 217 and 218 are applied to coils 219 and 220 to rotate a variable density element 221 relative to a light source 62c to vary the illumination falling on film 54 as a function of the product of the currents flowing through the coils 219 and 220. The variable density element 221 is driven by an instrument in the nature of a wattmeter and which operates in a similar manner to obtain the needed product of the two functions recorded on films 50 and 52. A spiral spring (not shown) biases the element 221 to its initial or "zero" position.

The modification of Fig. 16 illustrates an arrangement for obtaining the addition of the functions recorded on films 51 and 53. Light from sources 71a and 71b passes through the respective films 51 and 53 and into photoelectric cells 222 and 223. The outputs from amplifiers 224 and 225 are applied to coil 226 in additive relationship to move the variable density element 227. The element 227 is biased to an initial or zero position by a spring (not shown) and the light falling on the film 64 from the source 71c exposes the film in accordance with tne sum of the intensities of light received by photoelectric cells 222 and 223. If these cells, or the amplifier outputs, are differentially connected, then it is possible to record the difference between the functions on films 51 and 53 instead of the sum.

The phase angle values as recorded on films 51 and 53 may be added together in a somewhat different manner than illustrated in Fig. 12b by interchanging the positions of films 51 and 64 and by adding a lamp and slit corresponding with the lamps 51 and 75 associated with the film 53. The unexposed film may be located intermediate the exposed films and light from the two sources will be directed toward the intermediate film from locations on the opposite sides of the exposed films. The intermediate film is exposed in accordance with the sum of the light transmitted through the exposed films and, hence, the exposure of the intermediate film will be in accordance with the sum of the amounts of light passing through the exposed films.

Reference will now be made to another embodiment of the invention in which the process of synthesizing spectral records such as shown in connection with Fig. 13 is entirely eliminated.

To convert the spectral distribution of the energy of $f_1(t)$ to a frequency base, the Fourier transform $g_1(\omega)$ will be utilized which is representative of spectral distribution of energy versus frequency where, of course, $\omega$ is equal to $2\pi f$, and $f$ is equal to the frequency in cycles per second of the fundamental frequency. The transform may be expressed as follows:

$$g_1(\omega) = \frac{1}{2\pi} \int_{-\infty}^{\infty} f_1(t) e^{-j\omega t} dt \qquad (5)$$

The spectral distribution $g_1(\omega)$ may be conveniently separated into two terms typical of a Fourier analysis, namely:

$$g_1(\omega) = g_1'(\omega) + jg_1''(\omega) \qquad (6)$$

where $g_1'(\omega)$ is the real component and, hence, may be expressed as follows:

$$g_1'(\omega) = \frac{1}{\pi} \int_0^{\infty} f_1'(t) \cos \omega t\, dt \qquad (7)$$

and where $jg_1''(\omega)$ is the imaginary component and which may be expressed as follows:

$$g_1''(\omega) = \frac{1}{\pi} \int_0^{\infty} f_1''(t) \sin \omega t\, dt \qquad (8)$$

Referring to Fig. 2, it will be observed that when $t$ is less than zero, the input function $f_1(t)$ will be zero, which is a mathematical way of saying that prior to the explosion of the dynamite $f_1(t)$ will be zero. However, after the dynamite explosion, or when $t$ is greater than zero, $f_1(t)$ will, of course, be greater than zero. The foregoing observations apply generally to what the mathematicians refer to as "initial value functions," of which the function of Fig. 2 is exemplary. Other initial value functions which have been referred to are illustrated in Figs. 5a and 5b. Continuing with the mathematical analysis, the foregoing may be stated somewhat differently. The function $f_1(t)$ of Equation 5 can be separated into its cosine functions and into its sine functions.

Because $f_1(t)$ is an initial value function, it can be considered as made up of the sum of (1) the even harmonic components, and (2) the odd harmonic components. The even components are made up of cosine functions having finite values and sine functions having zero values. The sum of the even components is symmetrical about the time $t=0$. The odd components have sine functions of finite values and cosine functions of zero values. The sum of the odd components about the time $t=0$ is unsymmetrical or skew-symmetrical; that is to say, when the sum of the even components and the sum of the odd components are added together, they cancel each other for all values of time less than zero and they add together for all values of time greater than zero.

Mathematically, the foregoing can be stated:

$$f_1(t) = f_1'(t) + f_1''(t) \qquad (9)$$

where $f_1'(t)$ represents the even components having only cosine functions, i. e., $$f_1(-t) = f_1'(t) \qquad (10)$$

and $f_1''(t)$ represents the odd components having only sine functions, i. e., $$f_1''(-t) = -f_1''(t) \qquad (11)$$

A further observation can be drawn with respect to the cosine functions and the sine functions of foregoing Equation 9, namely, that each is one-half the value of $f_1(t)$, or in equation form:

$$f_1'(t) = f_1''(t) = \tfrac{1}{2} f_1(t) \qquad (12)$$

The even and odd components respectively represented by the cosine and sine functions are equal to each other in absolute value and are identical in their behavior to the main function $f_1(t)$ for all values of time greater than zero.

Accordingly, in terms of the Fourier transform $$g_1(\omega) = 2g_1'(\omega) \qquad (13)$$

and $$g_1(\omega) = 2g_1''(\omega) \qquad (14)$$

The two terms of Equations 13 and 14 express the general case. For the special case of the initial value function (Figs. 2 and 5) under consideration, the transforms will now be written, keeping in mind that the cosine function $$f_1'(t) = \frac{f_1(t)}{2} \qquad (15)$$

By making the substitution of Equation 15 in Equation 7, the first term of the transform $g_1(\omega)$ may be written:

$$g_1'(\omega) = \frac{1}{2\pi} \int_0^{\infty} f_1(t) \cos \omega t\, dt \qquad (16)$$

Similarly, the other term of the transform may be written:

$$g_1''(\omega) = \frac{1}{2\pi} \int_0^{\infty} f_1(t) \sin \omega t\, dt \qquad (17)$$

The functions $g_1'(\omega)$ and $g_1''(\omega)$ representing the spectral distribution of the input function can be obtained automatically by means of a harmonic analyzer. Such a process is schematically shown in Fig. 17. Referring now more specifically to Fig. 17, the phonographic film 18 representing the input function $f_1(t)$ is fed into a harmonic analyzer 270. As a result of this process there is obtained from the harmonic analyzer two films 230, 231, the film 230 representing the phonographic record of the function $g_1'(\omega)$ given by Equation 16 and the film 231 representing the phonographic record of the function $g_1''(\omega)$ given by Equation 17.

In a similar way, Fig. 16, there is obtained the spectral distribution of the output function $f_2(t)$, i. e.

$$g_2(\omega) = g_2'(\omega) + jg_2''(\omega) \qquad (18)$$

where $g_2'(\omega)$ and $g_2''(\omega)$ are given by formulas respectively similar to Equations 16 and 17. The phonographic film 42 representing the output function is fed into the harmonic analyzer 270. As a result of this process there are obtained from the harmonic analyzer 270 two films 232, 233, the film 232 representing phonographic record of $g_2'(\omega)$ and the film 233 representing the phonographic record $g_2''(\omega)$.

After having thus obtained the spectral distribution of the input and output functions there is determined the admittance of the earth. The admittance, designated as $A(\omega)$ is a complex function of frequency. More particularly, $$A(\omega) = \frac{\text{The output function } f_2(t) \text{ converted to a frequency base}}{\text{The input function } f_1(t) \text{ converted to a frequency base}}$$

$$= \frac{g_2'(\omega) + jg_2''(\omega)}{g_1'(\omega) + jg_1''(\omega)} \qquad (19)$$

As earlier explained in connection with Equations 1 and 2, and Figs. 10a, 10b, 11a and 11b, and as evident from Equation 19, the earth admittance between the transmitting and receiving points varies with frequency. Accordingly, the term "admittance function" as I have used it in this description and in the claims means the change of admittance with frequency. Since admittance depends upon frequency, reference has sometimes been made to the admittance function varying with frequency, the latter expression being used to refer to the same admittance or admittance function represented by $A(\omega)$, as in Equation 19.

In accordance with the present modification, there may now be achieved the ultimate goal, i. e., a seismogram of maximum legibility, i. e., one which would result from a "unit impulse" applied at the shot point.

Assume now that the unit impulse is of a rectangular form such as shown in Fig. 5a. Such an impulse rises suddenly to a relatively large value at the initial instant $t_0$ and decays suddenly after a very short time interval $t_1$. It is desirable to reduce the duration $t_1$ and to increase the intensity of such a rectangular impulse as much as possible since the reflections and refractions of the seismic records will be more and more concentrated. There will then be obtained a record of maximum legibility since the pressure impulse in the synthesis here utilized may be of infinitesimal duration and of high, infinite as a limit, intensity. Such an impulse designated here as an "idealized" unit impulse achieves a legibility of the seismic record up to its theoretical limit. Obviously, the idealized unit impulse contains only the useful portion and the parasitic portion has been entirely eliminated.

Let $u(\omega)$ represent the frequency spectrum of the "idealized" unit impulse. In general, the function $u(\omega)$ is complex, i. e., $$u(\omega) = u'(\omega) + ju''(\omega) \qquad (20)$$

In this particular case we know that $u''(\omega) = 0$ since the unit impulse is an even function. Furthermore, we know that $u'(\omega) = 1$, i. e., all the frequency components of the idealized unit impulse are equal. Consequently:

$$u(\omega) = 1 \qquad (21)$$

There can now be determined the function $F(t)$ representing the seismogram of maximum legibility. Let $G(\omega)$ represent the Fourier transform of $F(t)$. As already shown, $G(\omega)$ is a complex expression, i. e., $$G(\omega) = G'(\omega) + jG''(\omega) \qquad (22)$$

where $G'(\omega)$ represents the odd component of $F(t)$, (i. e. $F'(t)$) and $G''(\omega)$ represents the even component of $F(t)$, (i. e. $F''(t)$).

Since prior to the initiation of the impulse we had no seismogram, i. e. $F(t) = 0$, where $t$ is less than zero. Applying the same considerations already used, the function $G(\omega)$ may be replaced by $G'(\omega)$ in order to determine $F(t)$.

The function $G(\omega)$ represents the response of the earth to the unit impulse and consequently is represented by a product of the unit impulse, $u(\omega)$ and the earth admittance, $A(\omega)$, i. e., $$G(\omega) = u(\omega) \times A(\omega) \qquad (23)$$

Substituting corresponding terms from (21) and (19) in (23) there is obtained:

$$G(\omega) = \frac{g_2'(\omega) + jg_2''(\omega)}{g_1'(\omega) + jg_1''(\omega)} \times 1 \qquad (24)$$

$G(\omega)$ is complex as shown in Equation 22. However, in order to obtain the Fourier transform of $F(t)$ (the seismogram of maximum legibility) only the real component of $G(\omega)$ is used which is designated as $G_1'(\omega)$. Hence, multiplying numerator and denominator of Equation 24 by $g_1'(\omega) - jg_1''(\omega)$ and omitting the imaginary terms, there is obtained:

$$G_1'(\omega) = \frac{g_2'(\omega) \times g_1'(\omega) + g_2''(\omega) \times g_1''(\omega)}{[g_1'(\omega)]^2 + [g_1''(\omega)]^2} \qquad (25)$$

A phonographic record of the expression of Equation 25 can be obtained by means of any of the automatic computers well known in the art (for instance, by one of International Business Machines' computers). The applicable procedure is schematically shown in Fig. 19. The phonographic films 230, 231, 232, 233 representing the functions $g_1'(\omega)$, $g_1''(\omega)$, $g_2'(\omega)$, $g_2''(\omega)$ respectively are fed into the computer 275. As a result of this process there is obtained from the computer, the film 240 representing the expression $G_1'(\omega)$, i. e., the Fourier transform of the seismogram of maximum legibility.

The process as outlined in Fig. 19 can be performed manually, i. e., without an automatic computer. In such a case the function $G_1'(\omega)$ will be computed for various values of $\omega$ in accordance with Equation 25 expressed in terms of functions $g_2'(\omega)$, $g_1'(\omega)$, $g_2''(\omega)$, $g_1''(\omega)$. From the tabulated results of the calculations, there is prepared a phonographic record 240 shown as of the variable transparency type, i. e., representing the function $G'(\omega)$ thus computed. The record is obtained by exposing incremental lengths of a film to a controlled source of light whose intensities are determined by the results of the calculations.

The final step consists in producing from the film 240 the desired seismograph. Since $$F(t) = \int_0^\infty G_1'(\omega) \cos \omega t \, d\omega \qquad (26)$$

consequently, there is obtained the seismogram by use of a harmonic converter 272 in manner illustrated in Fig. 21. The phonographic film 240 representing the function $G_1'(\omega)$ is fed into the harmonic converter and as a result of this process there is obtained from the harmonic converter 272 the record 241 representing the seismogram of maximum legibility representative of the function $F(t)$.

The automatic computer 275 of Fig. 19 may be of any suitable type. There is diagrammatically illustrated in Fig. 20 an automatic computer of the electrodynamic type capable of performing the several operations which have already been described in connection with Fig. 19. In utilizing the computer of Fig. 20, it will be assumed that there are associated with each of the films 230—233 of Fig. 19 a light source, a slit, a photoelectric cell and an amplifier for producing an output current proportional to the function recorded. Accordingly, in Fig. 20 the input lines to coils $F_1$ and $F_2$ have been labeled $g_2'(\omega)$ to indicate that a direct current through said coils will be proportional to the function $g_2'(\omega)$ resulting from the response of a photoelectric cell to light passing through the record 232 of Fig. 19. In Fig. 20, the four Fourier transforms have been illustrated adjacent the respective input lines to the computer to indicate what the currents flowing in those lines represent.

The computer itself has a movable coil $M_1$ attached to a vertical shaft 500 and magnetically associated with stationary coils $F_1$ and $F_2$. Similarly, movable coil $M_2$ is attached to shaft 500 and magnetically associated with coils $F_3$ and $F_4$. Movable coil $M_3$ is magnetically associated with coils $F_5$ and $F_6$ and movable coil $M_4$ is magnetically associated with coils $F_7$ and $F_8$. The coils $M_1$ and $M_2$ are mounted in the same plane and their axes are parallel. The coils $M_3$ and $M_4$ are mounted in another plane with axes parallel one to the other, the latter plane being at right angles to that common to the coils $M_1$ and $M_2$. The adjacent fixed coils are coaxial and the axes of the several pairs of fixed coils are parallel and coplanar.

The combined action is effective to rotate a pointer 501 attached to shaft 500 relative to a quadrantal scale 502. The scale has a range of zero to infinity, the zero point corresponding to the position of the pointer when the movable coil $M_3$ is coaxial with field coils $F_5$ and $F_6$. At the same time, $M_4$ will, of course, be coaxial with field coils $F_7$ and $F_8$. The coils $M_1$ and $M_2$ will then be perpendicular to their respective field coils.

The circuit for the $g_2'(\omega)$ current can be traced through $F_1$ and $F_2$, while the circuit for $g_2''(\omega)$ can be traced through $F_3$ and $F_4$. The $g_1''(\omega)$ current passes through $M_2$, $M_3$, $F_5$ and $F_6$, while the $g_1'(\omega)$ current passes through $M_1$, $M_4$, $F_7$ and $F_8$. The systems including $M_1$ and $M_2$ are productive of torques $T_1$ and $T_2$, varying respectively with the products of $g_1'(\omega) \times g_2'(\omega)$ and $g_1''(\omega) \times g_2''(\omega)$. The measuring systems including $M_3$ and $M_4$ are productive of torques $T_3$ and $T_4$, varying respectively with $[g_1''(\omega)]^2$ and $[g_1'(\omega)]^2$.

The torques $T_1$, $T_2$, $T_3$ and $T_4$ of the said systems are also affected by the sines of the angles between the axes of the corresponding fixed and moving coils.

Since the axes of $M_3$ and $M_4$ are displaced 90° with respect to $M_1$ and $M_2$, the torques of the four elements can be written:

$$T_1 = g_1'(\omega) \times g_2'(\omega) \cos \alpha \qquad (27)$$

where $\alpha$ is the angular displacement of the axis of coil $M_3$ from the common axis of coils $F_5$ and $F_6$.

$$T_2 = g_1''(\omega) \times g_2(\omega) \cos \alpha \qquad (28)$$

$$T_3 = [g_1''(\omega)]^2 \sin \alpha \qquad (29)$$

$$T_4 = [g_1'(\omega)]^2 \sin \alpha \qquad (30)$$

The connections are such that the torques $T_1$ and $T_2$ are in the same direction but opposite to the torques $T_3$ and $T_4$. The instrument has no restoring force but the system will always adjust itself so that $$T_1 + T_2 = T_3 + T_4 \qquad (31)$$

Substituting in Equation 31 the equivalents from Equations 27 to 30, and simplifying, there is obtained:

$$\cos \alpha \: [g_1'(\omega) g_2'(\omega) + g_1''(\omega) g_2''(\omega)] = \\ \sin \alpha \: \{[g_1'(\omega)]^2 + \sin [g_1''(\omega)]^2\} \qquad (32)$$

Transposing the terms, there is obtained:

$$\frac{g_1'(\omega) g_2'(\omega) + g_1''(\omega) g_2''(\omega)}{[g_1'(\omega)]^2 + [g_1''(\omega)]^2} = \frac{\sin \alpha}{\cos \alpha} \qquad (33)$$

It will be noted from Equation 25 that the left-hand term of Equation 33 is equal to $G_1'(\omega)$. Hence, it follows, $$G_1'(\omega) = \frac{\sin \alpha}{\cos \alpha} = \tan \alpha \qquad (34)$$

If the scale 502 be calibrated in terms of the tangent of $\alpha$ (from zero to infinity), the values of $G_1'(\omega)$ may be read directly from scale 502.

Instead of tabulating the readings obtained from the scale 502, a variable density optical element, such as the element 221 of Fig. 15, may be driven by the shaft 500 relative to a light source to produce a record on an associated unexposed film, the record 240 utilized in Fig. 21.

Certain of the harmonic analyzers to be used in connection with the present invention need not be described in detail since they are well known to those skilled in the art. It is desirable that the analyzer employed shall have high resolution; that is to say, that values can be obtained from it which will produce a smooth curve. One form of analyzer, diagrammatically shown in Fig. 22, has a film 42 formed into an endless loop mounted on pulleys 350, 351, 352 and 353. The film 42 is driven at a constant speed by a synchronous motor 354 driving the pulley 353 by means of the shaft 355. In forming the endless belt, the beginning of the record is made to coincide with the end of the record. The optical system includes an incandescent lamp 360 projecting a beam of light upon the film 42 through a slit member 361. The beam of light passing through the film impinges upon a photocell 362 located on the side of the film remote from the slit member 361. The amount of light absorbed by the film, varied in accordance with the density of the film, is representative of the amplitude of the recorded signal. Consequently, with the film in motion, the output from the photocell 362 varies in accordance with the amplitude of the recorded signal. The output of the photoelectric cell 362 is amplified by an amplifier 363 and is fed into an harmonic analyzer. The number of times per second that the record 42 is driven past the photocell 362 determines the frequency of the signal which will be obtained and, of course, must be of a value capable of measurement by the wave analyzer 370. If the wave analyzer is capable of analyzing down to a frequency of 10 cycles per second, the film 42 must be driven past the photoelectric cell 362 ten times per second.

The harmonic wave analyzer 370 may be of the type described in United States Letters Patent No. 2,159,790 issued to Erich Freystedt and Fritz Bath on May 23, 1939. The entire frequency spectrum derived from the output of the photocell 362 is visually represented upon the screen of a cathode ray oscillograph. Thus, the Fourier representation of the signal recorded upon the film 42 is given automatically and visually upon the cathode ray oscillograph. The values obtained from the record or film 42 will correspond with the values shown in the graph of Fig. 9a. Similarly, the harmonic analysis of the record 18 will result in the values shown by the graph of Fig. 8a.

The schematic illustration of Fig. 22 is illustrative of the harmonic analyzer as manufactured by the General Radio Company and known to those skilled in the art as its type 736-A wave analyzer (and described in Catalog 8, 1939, pages 166-167). In operating General Radio's analyzer, it is merely necessary to turn a dial to a given setting, that setting corresponding to a frequency F. By means of a built-in indicating meter 371, there is automatically indicated the magnitude of the component having the frequency F. The amplitude of the Fourier component, Figs. 8a and 9a, corresponding to the frequency determined by the setting of the dial 372 will be read directly from the meter 371. There will then be assembled a table of values or they may be plotted directly on a graph representing the frequency spectrum obtained from a succession of measurements by means of the wave analyzer. Said measurements will be recorded as numbers or as points on cross-section paper. The position of the points will be determined with respect to the two coordinates, frequency and amplitude. By varying the setting of the dial 372, a large number of points may be obtained in succession, the said points determining the Fourier frequency spectrum, Fig. 8a, of the input function Fig. 7a, or the Fourier frequency spectrum, Fig. 9a, of the output function, Fig. 7b. Methods of harmonic analysis are also discussed in the book "High-Frequency Measurements" by August Hund.

There can also be used the harmonic analyzer of the type described in "A High Speed Product Integrator" by A. B. Macnee, Technical Report No. 136, Research Laboratory of Electronics, Mass. Institute of Technology, 1949. This report describes a harmonic analyzer for the determination of sine and cosine transforms of any transient function. The instrumental errors are in most cases of the order of 2%.

By means of a harmonic analyzer of the type disclosed in United States Letters Patent No. 2,098,326 issued to E. C. Wente, November 9, 1937, the phase angles, Fig. 8b for the input function and Fig. 9b for the output function, may be determined as well as the respective amplitude values of Figs. 8a and 9a.

It is to be understood that in some cases it will be desirable to eliminate undesirable low harmonics and this may be done in accordance with an arrangement shown in Fig. 23 in which the film 42 (or film 18 if desired) is moved in the direction of an arrow 450 past the lamp 451 which projects a narrow beam of light by means of a slit member 452 through the film 42 and onto a photocell 453. The film is driven by means of a motor 454 and a drive sprocket 455. The output of the photocell 453 after amplification through a suitable amplifier 457 is applied to a high-pass filter 458. The high-pass filter, of conventional design, is characterized by a cut-off frequency of $F_n$. All of the components present in the record 42 for frequencies below $F_n$ are greatly attenuated, while those frequencies above $F_n$ are transmitted with relatively low attenuation and one which is constant over the frequency range. For a given value of $F_n$, there will be a definite value $t_n$ of the time of arrival of a reflection or refracted wave. In other words, the later and deeper reflections arise by return of seismic energy of lower frequency than from seismic interfaces nearer the surface. By utilizing the high-pass filter 458, there will be attenuation of the seismic energy of lower frequency and thus the reflections due to return of seismic energy of higher frequency will be substantially and entirely unaffected by any low frequency energy which may be present.

Conversely, by using a low-pass filter, the higher frequencies may be attenuated, thus to emphasize to greater degree the later arrivals unaffected by the presence of the higher frequency energy. The output of the filter 458, either of the high-pass or low-pass type depending upon the need, is applied to a recording galvanometer 459 which includes a coil-mirror assembly mounted to move in the field of a permanent magnet in accordance with the current output of the filter. The lamp 461 throws a beam of light to the galvanometer mirror which is reflected to an initially unexposed film 462 to produce thereon a trace 463 representative of the variation in the current output of the filter 458.

The film 462 is driven by means of a motor 464 synchronously with the motor 454 and film 42. The record or film 462 is then utilized in the same manner as has been described for the film 42 (or the film 18). The foregoing is illustrative of variations which may be incorporated into a system embodying the present invention.

It is to be further understood that where the first synthetic seismogram does not show reflections with the high degree of resolution illustrated in Fig. 4, the filtering step may be utilized and additional synthetic seismograms thereafter produced with improved resolution.

At times, it may be desired to combine an input function of selected character with an admittance function representative of earth admittance along the path of seismic energy giving rise to a single reflection such as the reflection 24d of Fig. 4. The endless loop for the wave analyzer of Fig. 22 will then be formed from that part of the record corresponding with the period during the interval of return of seismic energy through the path corresponding with the reflection 24d.

The present method is based essentially on the analysis of a seismogram into its Fourier spectrum. It is well known that the elementary functions forming the Fourier spectrum are sine and cosine functions. Instead of using the sine and cosine functions, any other functions satisfying the conditions of orthogonality and completeness may be used. For instance, the seismogram may by analysis be expressed by Bessel functions instead of Fourier transforms. Hankel transforms, which are sometimes designated as Fourier Bessel transforms, may be used. In each such case, the steps of the method above described will be applicable. Instead of sine and cosine functions, Bessel functions or any other suitably chosen orthogonal functions may be employed.

The present invention makes possible considerable simplification of systems of the type disclosed in my co-pending application Serial No. 770,206, filed August 23, 1947. In that application, and with reference to Fig. 24 of the present application, there is disclosed a cross-section of the earth in which a loose weathered formation 610 extends below the surface to the top of a more consolidated layer 611. Below this are other strata such as formation 612 with an upper interface 613, formation 614 with an upper interface 615, and formation 616 with an upper interface 617.

For purposes of this illustration, interfaces 613, 615 and 617 are assumed to be capable of reflecting seismic waves. A source of continuous seismic waves 620, shown in the form of an eccentrically mounted flywheel 621 firmly attached to the ground, is rotated at a known constant rate by a shaft 623 driven by a motor 624. While the flywheel can be rotated at variable speeds by a gasoline engine or other suitable means, in Fig. 24 the input to motor 624 is shown derived from a variable-frequency oscillator 630, the frequency of which is varied by rotation of a condenser 631 by a motor 632. If seismic waves are generated by vibrator 620 of sufficient intensity, they will be refracted and reflected at elastic discontinuities in the earth, as well understood in the art. Seismic energy will be transmitted along the surface of the ground, the path being indicated by the dotted line 640. Seismic energy will also be transmitted along path 641, with reflection from interface 613, other paths being indicated by the dotted lines 642 and 643.

A seismometer or geophone 645 in contact with the earth at a suitable distance from the vibrator 620 detects the seismic waves arriving through the several paths. The output of the geophone is amplified by amplifier 647. Energy derived from oscillator 630 is applied to a delay network 650 to advance the wave derived from the oscillator by a predetermined time interval. The advanced wave is mixed in a detector 651 with the amplified waves appearing in the output of amplifier 647. Beat note frequencies appearing in the output of detector 651 are transmitted through a high-pass filter 652 with elimination of low-frequency signals which carry little useful information. The output of the filter 652 is applied to a wave analyzer 660 of the type illustrated in Fig. 22 and fully described in connection therewith.

In Fig. 25 instantaneous frequencies in cycles per second are plotted as ordinates against time in seconds as abscissae. The frequency of the oscillator 630 is periodically varied between the extremes of $F_{min}$ and $F_{max}$. The instantaneous frequency of the wave imparted to the earth by the flywheel 621 is, therefore, varying with time approximately as shown by the sawtooth solid line 670. The seismometer 645 detects a direct wave (the one which passes along the path 640), and it detects the reflected waves of paths 641—643. The latter appear in Fig. 25 by the solid lines 671, 672 and 673.

In Fig. 24 $h_1$, $h_2$ and $h_3$ designate respectively the depths from the earth's surface of the reflecting layers 613, 615 and 617. In Fig. 25 the times $t_1$, $t_2$ and $t_3$ designate respectively the time differences in travel between the outgoing wave 670 and the arrival at the seismometer 645 of the reflected waves 671, 672 and 673. As understood by those skilled in the art, the values $h_1$, $h_2$ and $h_3$ are related to the times $t_1$, $t_2$ and $t_3$ by a simple geometrical relationship involving the velocity of propagation of waves in the earth and the distance D, Fig. 24, between the vibrator 620 and the seismometer 645. If the velocities and times $t_1$, $t_2$ and $t_3$ may be determined with requisite accuracy, the depth will be known with corresponding accuracy.

Examination of the lines or graphs 670 and 671 of Fig. 25 shows that a frequency difference $\phi_1$ exists between the transmitted and reflected signals. This difference is constant during the periods when the frequencies of the input signal 670 and the output signal 671 are both increasing or both decreasing. The frequency difference can be represented as follows:

$$\phi_1 = 4(F_{max} - F_{min}) \times F_m \times t_1 \quad (35)$$

where the frequency variation of the signal 670 from $F_{max}$ to $F_{min}$ occurs $F_m$ times per second.

Similarly, for the frequency differences between input signal 670 and reflected waves 672 and 673:

$$\phi_2 = 4(F_{max} - F_{min}) \times F_m \times t_2 \quad (36)$$
$$\phi_3 = 4(F_{max} - F_{min}) \times F_m \times t_3 \quad (37)$$

The wave generated by the oscillator 630 and represented by the line 670 is advanced in time by an amount T in the delay network 650. Therefore, across the output terminals of the network 650 there appears a wave represented by the line 674. The frequency varies from $F_{max}$ to $F_{min}$ and occurs $F_m$ times per second, and consequently the period of the frequency modulation of the wave 670 is $$\frac{1}{F_m}$$

Instead of considering the wave 674 as advanced with respect to the wave 670 by an amount T, it can be considered that the wave 674 is delayed with respect to the wave 670 by an amount $$\frac{1}{F_m} - T$$

Accordingly, if $\phi$ designates the frequency difference between the signals 674, 670, it can be represented as follows:

$$\phi = 4(F_{max} - F_{min}) \times F_m \times T \quad (38)$$

Accordingly, the frequency difference $\phi$ between the signals 674 and 670 is known and is determined by T, i. e., by the adjustment of the delay network 650.

There appear in the output of detector 651 frequencies which are equal to the sum and difference of each frequency in the input with respect to every other frequency therein. Appearing in the output of the detector 651 are the following beat frequency signals which are of interest:

(A) Signal having frequency $\phi + \phi_1$ produced from beating the wave 674 against the wave 671. It is apparent that the value $\phi$ is known from the Equation 38 and consequently the signal (A) determines the value $\phi_1$. On the other hand, the value $\phi_1$ enables to find the time difference $t_1$ associated with the reflecting interface 613. Thus from Equation 35 we have $$t_1 = \frac{1}{4(F_{max} - F_{min}) \times F_m} \times \phi_1 \quad (39)$$

(B) Signal having frequency $\phi + \phi_2$ produced from beating the wave 674 against 672. The signal (B) determines the value $\phi_2$ and consequently the time difference $t_2$ associated with the reflecting interface 615. The time difference $t_2$ is represented by the following equation:

$$t_2 = \frac{1}{4(F_{max} - F_{min}) \times F_m} \times \phi_2 \quad (40)$$

(C) Signal having frequency $\phi + \phi_3$ produced from beating the wave 674 against the wave 673. The signal (C) determines the value $\phi_3$ and consequently the time difference $t_3$ associated with the reflecting interface 617. The time difference $t_3$ is represented by the following equation:

$$t_3 = \frac{1}{4(F_{max} - F_{min}) \times F_m} \times \phi_3 \quad (41)$$

(D) Signal having frequency $\phi_2 - \phi_1$. This signal is obtained from beating the wave 672 against the wave 671, and does not have any useful meaning.

(E) Signal having frequency $\phi_3 - \phi_1$. This signal is obtained by beating the wave 673 with the wave 671 and does not have any useful meaning.

(F) Signal having the frequency $\phi_3 - \phi_2$. This signal is obtained by beating the wave 672 against the wave 673 and does not have any useful meaning.

The signals (A), (B), (C), (D), (E) and (F) are subsequently applied to the input terminals of the filter 652.

Assume that 617 represents the reflecting interface located at the greatest depth that it is desired to consider, i. e., that the present instrument should be designed in such a manner as to be insensitive to the reflections originating at reflecting horizons that may be present below the interface 617. Therefore, the scale of the instrument is made so as to include all the reflections that may originate between the depths zero and $h_3$ and to exclude the reflections that may originate below $h_3$.

For the successful operation of the device the time delay T between 674 and 670 is so determined as to be equal or larger than the time delay between 670 and 673. Consequently, the adjustments of the delay network 650 are such that $$\phi \geq \phi \qquad (42)$$

The filter 652 is a cut-off filter that eliminates all the frequencies below the value $\phi$.

It is apparent that the useful signals (A), (B), (C), representing the time differences $t_1$, $t_2$, $t_3$, respectively, are located above the value $\phi$ and are transmitted by the filter 652.

Consequently, we obtain across the output terminals of the detector 651 a plurality of frequency components having frequency values $\phi_1$, $\phi_2$, $\phi_3$. It is also apparent that to each of said frequency values corresponds a time difference $t_1$, $t_2$, $t_3$ associated with the subsurface interfaces 613, 615, 617 and that the magnitudes of said frequency components represent the amounts of energy reflected by said interfaces, i. e., the reflecting coefficients of said interfaces. Consequently, in order to determine the times of travel corresponding to reflecting interfaces and their coefficients of reflection, it is necessary to determine various frequency components of the output of the filter 652, i. e., to perform the harmonic analysis of said output.

As shown in Fig. 24, the frequency determining dial of the wave analyzer is designated by the numeral 661 and the amplitude of the sinusoidal component corresponding to the frequency setting of the dial is shown on the meter 663. Consequently, the meter 663 indicates the amplitude of the Fourier component corresponding to the frequency determined by the setting of the dial 661. The present method consists in plotting graphically the curve representing the frequency spectrum by producing a succession of measurements by means of the wave analyzer and recording said measurements as points on a paper in which the position of the said points with respect to two coordinates represent the measurements observed. The one coordinate represents the frequency and represents, therefore, the setting of the dial 661 and the other coordinate represents the indication of the meter 663 and represents therefore the amplitude of the corresponding component.

In our previous discussion we have assumed that the energy derived from the oscillator 620 is subjected only to reflection at the interfaces 613, 615 and 617, respectively. Consequently, it was assumed that the properties of the earth are uniform and are subject to discontinuous changes at depths $h_1$, $h_2$, and $h_3$ corresponding to the interfaces 613, 615, 617. Actually, however, the properties of the earth vary continuously with the depth and cause not only reflection but diffraction and scattering, taking place at all depths below the earth's surface. Consequently, to each setting of the dial corresponds a point in said plane of two coordinates representing the record of the measurements. It is apparent that by varying the setting of the dial a number of points is obtained in succession, said points determining a line shown in Fig. 26 which defines graphically the Fourier frequency spectrum.

Consequently, in the diagram of Fig. 26 the ordinates represent frequencies, or the time differences associated with various subsurface layers and the abscissae represent the intensities of the waves reflected by said layers. The abscissae represent the times of sound waves reflected by various layers from their point of origin to the seismometer and, therefore, they are related to the depths of said layers by simple geometrical relationships involving the distance from the point of disturbance to the seismometer and the velocity of sound waves in the earth. Consequently, from the knowledge of said geometrical relationships we can derive from the graph of Fig. 26 the characteristics of the substrata at any desired depth.

It is now apparent that in order to obtain a graph as shown in Fig. 26 representing the characteristics of the earth, the following steps are necessary:

(a) To determine the response of the earth to a varying frequency force;

(b) To intermodulate the result of the step (a) with the varying frequency function representing the imparted force;

(c) To perform Fourier analysis upon the results of the step (b).

By referring to Fig. 24 it is apparent that the result of the step (a) is obtained in the output of the seismometer 645, the result of the step (b) is obtained in the output of the detector 651, and the result of the step (c) is shown in Fig. 26 and obtained by means of the frequency analyzer 660.

The input signals varying between $F_{min}$ and $F_{max}$ may then comprise the arbitrary forces applied to the earth, and the amplitude of such forces may be made of any selected value without the physical limitations incident to the use of mechanical devices as exemplified by the eccentric flywheel. Moreover, the amplitude of the variable-frequency input signal may be constant throughout the range of frequencies.

In accordance with the present invention, the above steps may be performed without the physical limitations incident to the use of mechanical devices as exemplified by the eccentric flywheel 621. The above steps may be performed as follows:

Step (A)

Two records are prepared in the same manner as explained in connection with the preparation of records 52 and 53 of Figs. 12a and 12b, namely, Record A-1 representing the amplitude-frequency spectrum of the frequency-modulated input signal;

Record A-2 representing the phase-frequency spectrum of the frequency-modulated input signal.

In addition to the foregoing two records, there are produced in a manner explained above in the specification in connection with records 50 and 51 the following two records:

Record B-1 representing the amplitude-frequency spectrum of the earth's admittance;

Record B-2 representing the phase-frequency spectrum of the earth's admittance.

From the records A-1, A-2, B-1 and B-2, there are produced as in Figs. 12a and 12b two records as follows:

Record AB-1 forming the product of the signals recorded on A-1 and B-1. The record AB-1 represents the amplitude-frequency spectrum of the earth motion at the seismometer 645.

Record AB-2 representing the difference between the signals recorded on A-2 and B-2. The record AB-2 represents the phase-frequency spectrum of the earth motion at the seismometer 645.

Subsequently, the records AB-1 and AB-2 are synthesized, as in Fig. 13, to produce a record C representing the time variation of the earth motion as detected by the seismometer 645. Thus, there is determined the response of the earth to the frequency-modulated input force and step (A) has now been completed.

Step (B)

A record D is now prepared representing the time-amplitude variation of the frequency-modulated input signal. This record differs from A-1 and A-2 since the latter two records represent the amplitude-frequency spectrum of said input signal.

Mathematically, or in manner similar to the arrangements of Figs. 12a and 15, there is produced a record E representing the product of the signal recorded on C with the signal recorded on D. Since modulation is equivalent to the multiplication of the two signals, the record E represents the result of intermodulating the output of the seismometer 645 (represented on C) with the input signal (represented on D). The record E represents essentially the output of the filter 652.

Step (C)

By means of a harmonic analyzer, there is then produced a record F, representing the amplitude-frequency spectrum of the signal recorded on E. The record E is in the form of a graph similar to that shown in Fig. 26.

The present application is a continuation-in-part of my application Serial No. 793,828, filed December 26, 1947, and now abandoned, and a continuation-in-part of my co-pending application Serial No. 770,206, filed August 23, 1947, and now abandoned.

While several modifications of the present invention have been illustrated, it is to be understood that other modifications may be made within the scope of the claims.

What is claimed is:

1. In a method of producing a seismic record representing waves that would travel from a shot point to a reception point if an arbitrary force that varies as a predetermined function of time were to be applied to the earth at the shot point, the portion of the earth between said points being characterized by an admittance function representing the variation with frequency of earth admittance between said points, the steps which comprise: generating a signal which varies in the same manner as the amplitude associated with Fourier components of said admittance function varies with frequency, variably modifying said signal in accordance with the phase angles of said Fourier components of said admittance function, and recording said modified signal against time.

2. In a method of producing a seismic record representing waves which would travel from a shot point to a reception point if an idealized arbitrary force that varies as a predetermined function of time were to be applied to the earth at the shot point, the portion of the earth between said points being characterized by an admittance function representing the variation with frequency of earth admittance between said points, the steps which comprise: generating a signal having a frequency base which with respect to frequency varies in the same manner as the quotients of the amplitudes associated respectively with Fourier components of said admittance function and of Fourier components of said idealized force, variably modifying said signal in accordance with the difference between the phase angles respectively of said Fourier components of said admittance function and of said components of said idealized force, generating from said frequency-base signal a time-base signal, and recording said time-base signal as a seismogram due to said idealized force.

3. In a method of producing, from a seismic record of a given length (L) produced by application to the earth of an impulse of energy, a synthetic seismic record representing waves which would travel from a shot point to a reception point if an idealized arbitrary force that varies as a predetermined function of time were to be applied to the earth at the shot point, the steps which comprise: generating a signal whose amplitude with respect to frequency varies in accordance with frequency components of said seismic record, generating a second signal whose amplitude varies with the frequency in accordance with the phase angle of frequency components of said seismic record, said frequency being determined by the length (L) of the seismic record divided by $2\pi n$ where $n$ is an integer, dividing said first signal by a third signal having an amplitude varying with frequency in accordance with the nature of the impulse applied, subtracting from said second signal a fourth signal having an amplitude varying with the phase angle of frequency components of the impulse applied, generating a fifth signal whose amplitude is determined jointly by the quotient of said first and third signals and the difference between said second and fourth signals, generating a sixth signal and recording it as a function of time over an interval corresponding with the length of said seismic record (T) with an amplitude determined by said fifth signal to produce the kind of seismic record which would result from application to the earth of said idealized arbitrary force.

4. In a method of producing a seismic record representing waves that would travel from a shot point to a reception point if an arbitrary force that varies as a predetermined function of time were to be applied to the earth at the shot point, the portion of the earth between said points being characterized by an admittance function representing the variation with frequency of earth admittance between said points, the steps which comprise: generating a signal which varies with time in the same manner as a selected magnitude associated with Fourier components of said force varies with frequency, said selected magnitude varying with frequency in the same manner as the Fourier spectrum of the seismic record varies with frequency, and variably modifying said signal with time in accordance with a function that varies with time in the same manner as said admittance function varies with frequency for production of an attenuated signal that varies with time in the same manner as said selected magnitude associated with the Fourier spectrum of said seismic record would vary with frequency.

5. In a method of producing a seismic record representing waves that would travel from a shot point to a reception point if an arbitrary force that varies as a predetermined function of time were to be applied to the earth at the shot point, the portion of the earth between said points being characterized by an admittance function representing the variation with frequency of earth admittance between said points, the steps which comprise: generating a signal which varies with time in the same manner as the amplitude associated with Fourier components of said force varies with frequency, and variably modifying said signal in accordance with a function that varies with time in the same manner as said admittance function varies with frequency, thereby producing a modified signal that varies with time in the same manner as the amplitude associated with the Fourier spectrum of said seismic record would vary with frequency.

6. In a method of producing a seismic record representing waves that would travel from a shot point to a reception point if an arbitrary force that varies as a predetermined function of time were to be applied to the earth at the shot point, the portion of the earth between said points being characterized by a function representing the variation with frequency of the seismic wave admittance between said points, the steps which comprise: generating a signal which varies with time in the same manner as said force varies with frequency, generating another signal which varies with time in the same manner as said function varies with frequency, and combining said two signals into a resultant signal that varies with time in the same manner as the spectrum of such seismic record would vary with frequency.

7. In a method of producing a seismic record representing waves that would travel from a shot point to a reception point if an arbitrary force that varies as a predetermined function of time were to be applied to the earth at the shot point, the portion of the earth between said points being characterized by a function representing the variation with frequency of the phase of the seismic wave admittance, the steps which comprise: generating a signal which varies with time in the same manner as the phase of Fourier components of said force varies with frequency, generating another signal which varies with time in the same manner as said function varies with frequency, and algebraically adding said signals into a resultant signal, said resultant signal varying with time in the same manner as the phase of various Fourier components varies with frequency.

8. In a method of producing a seismic record representing waves that would travel from a shot point to a reception point if an arbitrary force that varies as a predetermined function of time were to be applied to the earth at the shot point, the portion of the earth between said points being characterized by a function representing the variation with frequency of the amplitude of the seismic wave admittance, the steps which comprise: generating a signal which varies with time in the same manner as the amplitudes of Fourier components of said force vary with frequency, generating another signal which varies with time in the same manner as said function varies with frequency, and combining said signals into a resultant signal representing the product of said first two signals, said resultant signal varying with time in the same manner as the amplitudes of various Fourier components of said record vary with frequency.

9. In seismic prospecting in which a seismic wave of complex wave form is generated at a shot point and received at a reception point remote therefrom after being reflected by subsurface structures, the method of determining the seismic wave admittance of the earth with respect to the travel of such waves from said shot point to said reception point which comprises the steps of: receiving at a reference point adjacent said shot point waves which travel directly thereto from said shot point, analyzing the waves received at said reference point to ascertain the amplitude spectrum thereof and the phase spectrum thereof, also analyzing the waves received at said reception point to ascertain the amplitude spectrum thereof and the phase spectrum thereof, determining the ratios of the amplitudes of said two amplitude spectra at various frequencies thereof to ascertain the amplitude characteristic of said admittance at those frequencies, determining the differences between the phases of said two spectra at various frequencies thereof to ascertain the phase characteristic of said admittance, generating a signal with respect to a time base corresponding with the time base of waves received at said reception point with an amplitude determined by the ratios of the amplitudes of said two amplitude spectra, modifying the amplitude of said signal in accordance with said difference between said phases, and recording said modified signal as a seismogram.

10. In a method of analyzing seismic waves that would travel from a shot point to a reception point if an arbitrary force that varies as a predetermined function of time were to be applied to the earth at the shot point, the steps which comprise: producing a first record having a transparency that varies along its length in the same manner that the amplitudes of such force vary as a function of frequency, producing a second record having a transparency that varies along its length in the same manner that the amplitude characteristic of the seismic wave admittance of the earth between said points varies as a function of frequency, transmitting light through portions of said two records corresponding to the same frequency in the respective records to produce a third record having a transparency along its length determined by the transparencies of said first record and of said second record and representative of the amplitude of a component with respect to frequency of a seismogram resulting from said arbitrary force.

11. In a method of analyzing seismic waves that would travel from a shot point to a reception point if an arbitrary force that varies as a predetermined function of time were to be applied to the earth at the shot point, the steps which comprise: producing a first record having a transparency that varies along its length in the same manner that the amplitudes of such force vary as a function of frequency, producing a second record having a transparency that varies along its length in the same manner that the phase characteristic of the seismic wave admittance of the earth between said points varies as a function of frequency, and transmitting light through portions of said two records corresponding to the same frequency in the respective records to produce a third record having a transparency along its length determined by the transparencies of said first record and of said second record representative of the phase with respect to frequency of a seismic record resulting from the application of said arbitrary force.

12. In a method of producing a seismic record representing waves which would travel from a shot point to a reception point if an idealized arbitrary force that varies as a predetermined function of time were to be applied to the earth at the shot point, the portion of the earth between said points being characterized by an admittance function representing the variation with frequency of earth admittance between said points, the steps which comprise: generating signals having a frequency base, two of said signals with respect to frequency respectively varying in the same manner as the amplitude and the phase associated with Fourier components of a force applied to said earth at said shot point which produces earth movement at said reception point, two other signals varying respectively, with respect to frequency, in the same manner as the amplitude and phase associated with Fourier components of said resultant earth movement, recording said signals on films respectively having a transparency varying with the amplitude of said signals, each of said records having corresponding lengths and each related to a predetermined duration of said earth movement, exposing a film in accordance with the combined transparency of the two films representative of amplitudes to produce a record representative of their quotient, exposing a film in accordance with the combined transparencies of the two records representative of said phases to produce a record representative of the algebraic sum of said phases, transmitting light through said last-named films, generating a signal from the light transmitted through one of said last-named films and modifying said signal in accordance with light passed through the other of said last-mentioned films, and recording said signal as a seismogram of a record produced by said idealized arbitrary force of initial-function character having a value of unity.

13. The method of producing improved seismograms which comprises detecting as a first time-function the earth movement at a receiving station resulting from application of a force to the earth, harmonically analyzing said first time function to produce a frequency function $g_2'(\omega)$ and a frequency function $g_2''(\omega)$, harmonically analyzing a second time function representative of the force applied at a transmitting station which gave rise to said earth movement to produce a frequency function $g_1'(\omega)$ and a frequency function $g_1''(\omega)$, where $g_2'(\omega)$ and $g_2''(\omega)$ are respectively the real and imaginary components of Fourier transforms of the time function of said earth movement, and $g_1'(\omega)$ and $g_1''(\omega)$ are respectively the real and imaginary components of Fourier transforms of the time function of the force applied at said transmitting station, combining the harmonic analyses of said frequency functions in the relation expressed by $$\frac{g_2'(\omega) \cdot g_1'(\omega) + g_2''(\omega) \cdot g_1''(\omega)}{[g_1'(\omega)]^2 + [g_1''(\omega)]^2}$$

in determination of the frequency function representing earth admittance between transmitting and receiving stations, harmonically analyzing said frequency function representing earth admittance to produce a time function of earth movement which would result from the application of a unit impulse of force to the earth at the transmitting station, and recording the last-named time-function as a seismogram.

14. The method of producing improved seismograms which comprises detecting as a first time function the earth movement at a receiving station resulting from application of a burst of energy to the earth at a transmitting station, harmonically analyzing said first time function to produce a frequency function $g_2'(\omega)$, and a frequency function $g_2''(\omega)$, detecting as a second time function said burst of energy at said transmitting station in a region where said burst of energy does not exceed the elastic limit of the earth, harmonically analyzing said second time function of said force to produce a frequency function $g_1'(\omega)$ and a frequency function $g_1''(\omega)$, where $g_2'(\omega)$ and $g_2''(\omega)$ are respectively the real and imaginary components of Fourier transforms of the time function of said earth movement, and $g_1'(\omega)$ and $g_1''(\omega)$ are respectively the real and imaginary components of Fourier transforms of said linear time function, combining the harmonic analyses of said frequency functions in the relation expressed by $$\frac{g_2'(\omega)g_1'(\omega) + g_2''(\omega)g_1''(\omega)}{[g_1'(\omega)]^2 + [g_1''(\omega)]^2}$$

in determination of the frequency function representing the earth admittance between transmitting and receiving stations, harmonically analyzing said frequency function of earth admittance to produce a time function of earth movement which would result from the application of a unit impulse of force to the earth at the transmitting station, and recording the last-named time-function as a seismogram.

15. The method of seismic exploration which comprises applying to the earth at a transmitting location a pulse of energy for producing earth movement at a remotely located receiving location, detecting the resultant earth movement adjacent the point of application of said energy in a location in which the earth movement does not exceed the elastic limit of the earth formation, recording with respect to time the earth movement at said transmitting location, detecting at said receiving location earth movement resulting from said impulse of energy, recording with respect to time the earth movement detected at said receiving location, transforming each of said records into graphs representative respectively of the amplitude and of the phase against frequency, dividing the amplitude component over the frequency range of said graph obtained from the record made at the receiving station by the amplitude component of the graph made from the record made at the transmitting station to obtain a series of scalar values representative of earth admittance, subtracting from the phase angles over the frequency range of the graph at the receiving station the corresponding phase angles for the corresponding frequencies from the graph made from the record at the transmitting station to obtain a series of values representing the phase angle of earth admittance, reproducibly recording on separate records with respect to frequency the variation in the value of the earth's admittance and the variation in the phase angle of the earth's admittance, reproducibly recording with respect to frequency two records respectively representative of the amplitude and of the phase angle of an arbitrary impulse of force of predetermined shape and capable of resolution by harmonic analyses, reproducibly recording on a record the products over the frequency range of said amplitude records respectively of said impulse and of said earth admittance, recording on a reproducible record the sums over the frequency range of the phase angle records representative of the applied impulse of predetermined shape and the phase angles of the earth's admittance, the two resultant records respectively being representative of the amplitude and phase angles of a harmonic analysis of the waveform which would result from the application to said earth of said admittance of said impulse of said predetermined shape, and generating in accordance with said two resultant records a signal which with respect to time represents a seismogram of the type resulting from application to the earth at said transmitting location said arbitrary force.

16. A system of producing a seismic record representing waves which would travel from a shot point to a reception point if an idealized arbitrary force varying as a predetermined function of time were applied to the earth at the shot point, the portion of the earth between said points being characterized by an admittance function representing the variation with frequency of earth admittance between said points, comprising means for generating a signal having a frequency base which with respect to frequency varies in the same manner as the quotient of the amplitudes associated respectively with Fourier components of said admittance function and of Fourier components of said idealized force, means for variably attenuating said signal in accordance with the difference between the phase angles respectively of said Fourier components of said admittance function and of said components of said idealized force, means for generating from said frequency-base signal a time-base signal, and means for recording said time-base signal as a seismogram of the type producible by said idealized force.

17. A system for producing improved seismograms comprising means for detecting as a first time function the earth movement at a receiving station resulting from application of a force to the earth, means for harmonically analyzing said first time function to produce a frequency function $g_2'(\omega)$ and a frequency function $g_2''(\omega)$, means for harmonically analyzing a second time function representative of the force applied at a transmitting station which gave rise to said earth movement to produce a frequency function $g_1'(\omega)$ and a frequency function $g_1''(\omega)$, where $g_2'(\omega)$ and $g_2''(\omega)$ are respectively the real and imaginary components of Fourier transforms of the time function of said earth movement, and $g_1'(\omega)$ and $g_1''(\omega)$ are respectively the real and imaginary components of Fourier transforms of the time function of the force applied at said transmitting station, means for combining the harmonic analyses of said time functions in the relation expressed by $$\frac{g_2'(\omega)g_1'(\omega) + g_2''(\omega)g_1''(\omega)}{[g_1'(\omega)]^2 + [g_1''(\omega)]^2}$$

in determination of the frequency function representing the earth admittance between transmitting and receiving stations, means for harmonically analyzing said frequency function representing the earth admittance to produce a time function of earth movement which would result from the application of a unit impulse of force to the earth at the transmitting station, and means for recording the last-named time function as a seismogram.

18. In a method of producing a seismic record representing waves that would travel from a shot point to a reception point if an arbitrary force that varies as a predetermined function of time were to be applied to the earth at the shot point, the portion of the earth between said points being characterized by functions both varying with frequency and one representing the phase of the seismic wave admittance and the other representing the amplitude of the seismic wave admittance, the steps which comprise: generating a first signal which varies with time in the same manner as the amplitudes of Fourier components of said force vary with frequency, generating a second signal which varies with time in the same manner as said function varies with frequency, combining said signals into a resultant third signal representing the product of said first and second signals, said resultant third signal varying with time in the same manner as the amplitudes of various Fourier components of said record vary with frequency, generating a fourth signal which varies with time in the same manner as the phase of Fourier components of said force varies with frequency, generating a fifth signal which varies in time in the same manner as the phase of said admittance varies with frequency, combining said fourth and fifth signals into a resultant sixth signal representing the algebraic sum, said resultant sixth signal varying with time in the same manner as the phase of various Fourier components varies with frequency, generating a seventh alternating-current signal, varying its amplitude in accordance with the amplitude of said third signal, varying the phase of said alternating-current seventh signal in accordance with said sixth signal, recording said seventh signal as modified in amplitude and phase with respect to time, and generating from said recorded signal a seismic wave.

19. In a method of producing a seismic record representing waves that would travel from a shot point to a reception point if an arbitrary force varying between a maximum value and a minimum value at a continuously changing frequency were to be applied to the earth at the shot point, the portion of the earth between said points being characterized by an admittance function representing the variation with frequency of earth admittance between said points, the steps which comprise: generating a first signal which varies with time in the same manner as the amplitude associated with Fourier components of said force varies with frequency, and variably modifying said signal in accordance with a function that varies with time in the same manner as said admittance function varies with frequency, thereby producing a modified signal that varies with time in the same manner as the amplitude associated with the Fourier spectrum of said seismic record would vary with frequency, synthesizing a Fourier spectrum of said first signal, thereby producing a second signal varying with time in accordance with said seismic record, generating a third signal varying with time in accordance with the variation of said force, recording the product of said second signal and said third signal and producing a record representing the Fourier spectrum of said product.

20. In a method of producing a seismic record representing waves that would travel from a shot point to a reception point if an arbitrary force varying between a maximum value and a minimum value at a continuously changing frequency were to be applied to the earth at the shot point, the portion of the earth between said points being characterized by functions both varying with frequency and one representing the phase of the seismic wave admittance and the other representing the amplitude of the seismic wave admittance, the steps which comprise: generating a first signal which varies with time in the same manner as the amplitudes of Fourier components of said force vary with frequency, generating a second signal which varies with time in the same manner as said function varies with frequency, combining said signals into a resultant third signal representing the product of said first and second signals, said resultant third signal varying with time in the same manner as the amplitudes of various Fourier components of said record vary with frequency, generating a fourth signal which varies with time in the same manner as the phase of Fourier components of said force varies with frequency, generating a fifth signal which varies in time in the same manner as the phase of said admittance varies with frequency, combining said fourth and fifth signals into a resultant sixth signal representing the algebraic sum, said resultant sixth signal varying with time in the same manner as the phase of various Fourier components varies with frequency, generating a seventh alternating-current signal, varying its amplitude in accordance with the amplitude of said third signal, varying the phase of said alternating-current seventh signal in accordance with said sixth signal and recording said seventh signal as modified in amplitude and phase with respect to time, generating an eighth signal varying with time in accordance with the variation of said force, recording the product of the seventh and the eighth signals and producing a record representing a Fourier spectrum of said product.

21. In a method of producing a seismic record representing waves traveling from a transmitting point to a reception point by application to the earth at said transmitting point of a synthetic force varying with time in a selected manner, the steps which comprise: suddenly applying to the earth a force at said transmitting point giving rise to earth movement at said transmitting point over a predetermined time interval, said force representing an input function and the earth movement at said receiving point representing an output function, generating signals varying in the same manner as does an admittance function of the earth between the transmitting and receiving points established by the relationship between said input and output functions, generating signals representative of said synthetic force, combining said signals varying as does said admittance function with said signals representative of said synthetic force to produce resultant signals which vary in the same manner as would earth movement at said reception point produced by application to the earth at said transmitting point of said synthetic force.

References Cited in the file of this patent

UNITED STATES PATENTS

| Number | Name | Date |
|---|---|---|
| 2,098,326 | Wente | Nov. 9, 1937 |
| 2,144,812 | Rieber | Jan. 24, 1939 |
| 2,148,422 | Blav | Feb. 28, 1939 |
| 2,155,507 | Rieber | Apr. 25, 1939 |
| 2,207,398 | Floyd | July 9, 1940 |
| 2,243,730 | Ellis | May 27, 1941 |
| 2,557,714 | Williams | June 19, 1951 |